United States Patent [19]

Sato et al.

[11] Patent Number: 4,862,281
[45] Date of Patent: Aug. 29, 1989

[54] MANUAL SWEEPING APPARATUS

[75] Inventors: Takashi Sato; Kazuki Yamauchi; Norio Ishibashi, all of Tokyo, Japan

[73] Assignee: Casio Computer Co., Ltd., Tokyo, Japan

[21] Appl. No.: 133,023

[22] Filed: Dec. 15, 1987

[30] Foreign Application Priority Data

| Dec. 18, 1986 | [JP] | Japan | 61-299975 |
| Dec. 24, 1986 | [JP] | Japan | 61-309420 |
| Dec. 26, 1986 | [JP] | Japan | 61-315553 |
| Aug. 27, 1987 | [JP] | Japan | 62-213551 |

[51] Int. Cl.$^4$ .............................. H04N 1/04
[52] U.S. Cl. ................... 358/400; 358/285; 358/293; 358/494; 282/59
[58] Field of Search ............ 358/256, 285, 293, 296; 382/59; 364/200, 900

[56] References Cited

U.S. PATENT DOCUMENTS

| 3,541,248 | 11/1970 | Young . | |
| 3,767,020 | 10/1973 | Rowe . | |
| 4,180,798 | 12/1979 | Komori | 358/256 |
| 4,249,216 | 2/1981 | Kanda | 358/257 |
| 4,523,235 | 6/1985 | Rajchman . | |
| 4,611,246 | 6/1986 | Nihei . | |
| 4,623,985 | 11/1986 | Morimoto | 364/900 |
| 4,626,925 | 12/1986 | Toyoda | 358/285 |
| 4,639,790 | 1/1987 | Kusaka | 358/285 |
| 4,701,804 | 10/1987 | Toyoda | 358/280 |
| 4,717,965 | 1/1988 | Mashiko et al. | 358/285 |
| 4,731,668 | 3/1988 | Satomura | 358/256 |
| 4,785,357 | 11/1988 | Dreyfus | 358/256 |

FOREIGN PATENT DOCUMENTS

| 0146472 | 6/1985 | European Pat. Off. . |
| 3601323 | 7/1986 | Fed. Rep. of Germany . |
| 115773 | 9/1980 | Japan . |
| 0094450 | 5/1986 | Japan . |

Primary Examiner—James J. Groody
Assistant Examiner—Jerome Grant, III
Attorney, Agent, or Firm—Frishauf, Holtz, Goodman & Woodward

[57] ABSTRACT

A manual sweeping apparatus comprising a housing, rollers which can rotate in contact with an original or a sheet of paper, an image sensor, a printer, memories, and a key-input section. When the housing is swept across an original, with the rollers kept in contact with the original, the image sensor reads the image information from the original. The image information is stored in one of the memories. Character data is input by operating the key-input section, and is stored in another one of the memories. Thereafter, when the housing is swept across a sheet of paper, with the rollers kept in contact with the paper, both the image data and the character data are printed, in a combined form, on the sheet of paper.

27 Claims, 38 Drawing Sheets

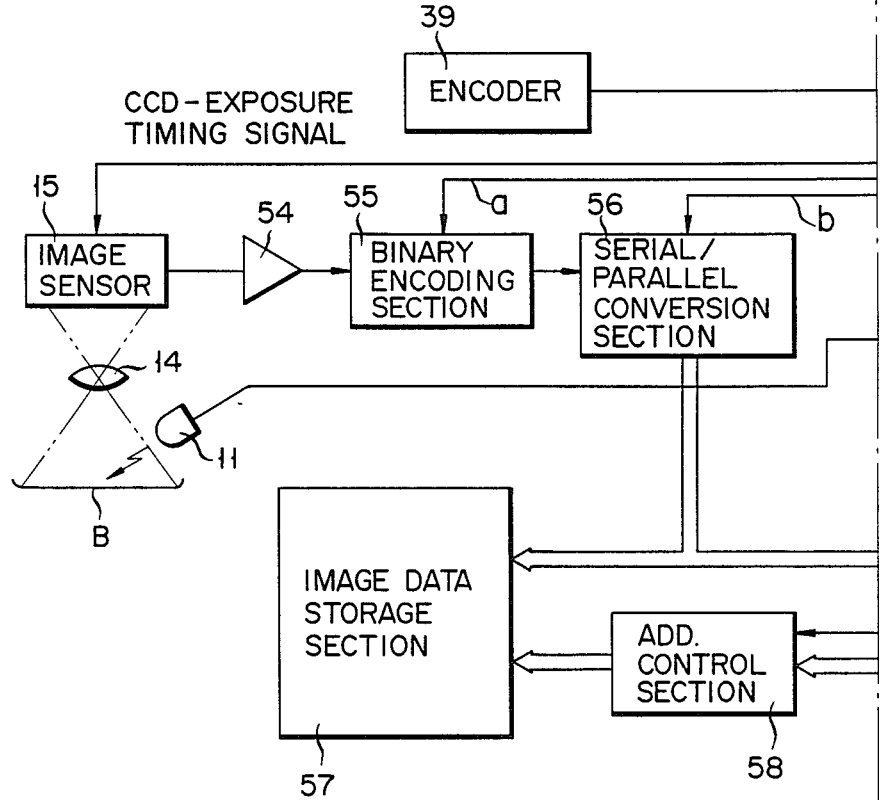
F I G. 4A

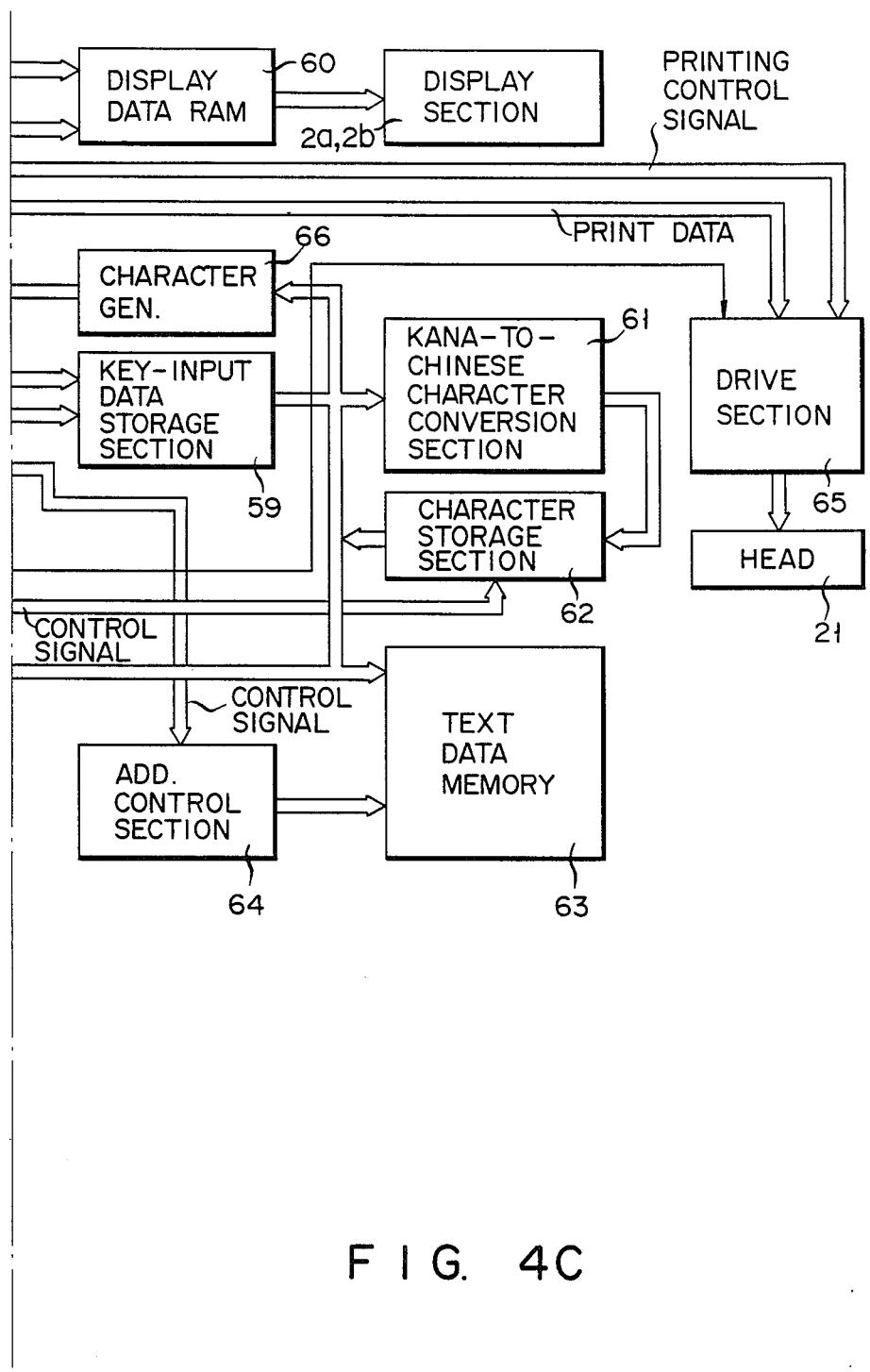
F I G. 4C

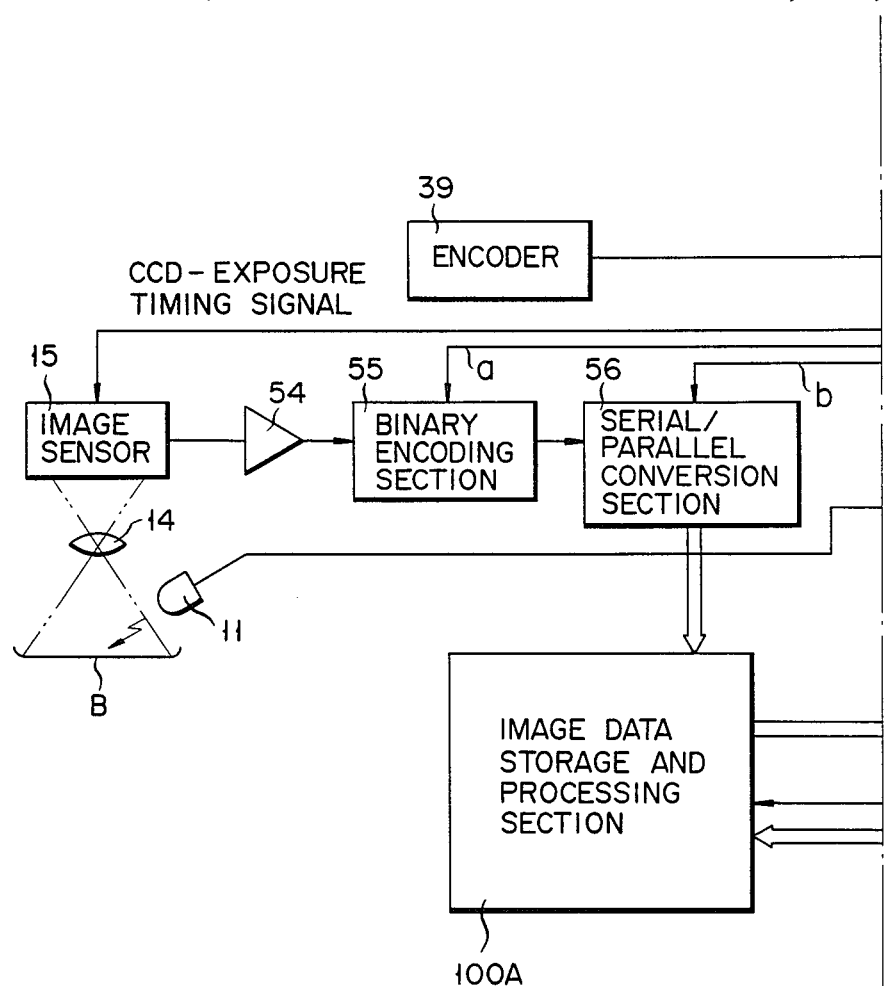
F I G. 12A

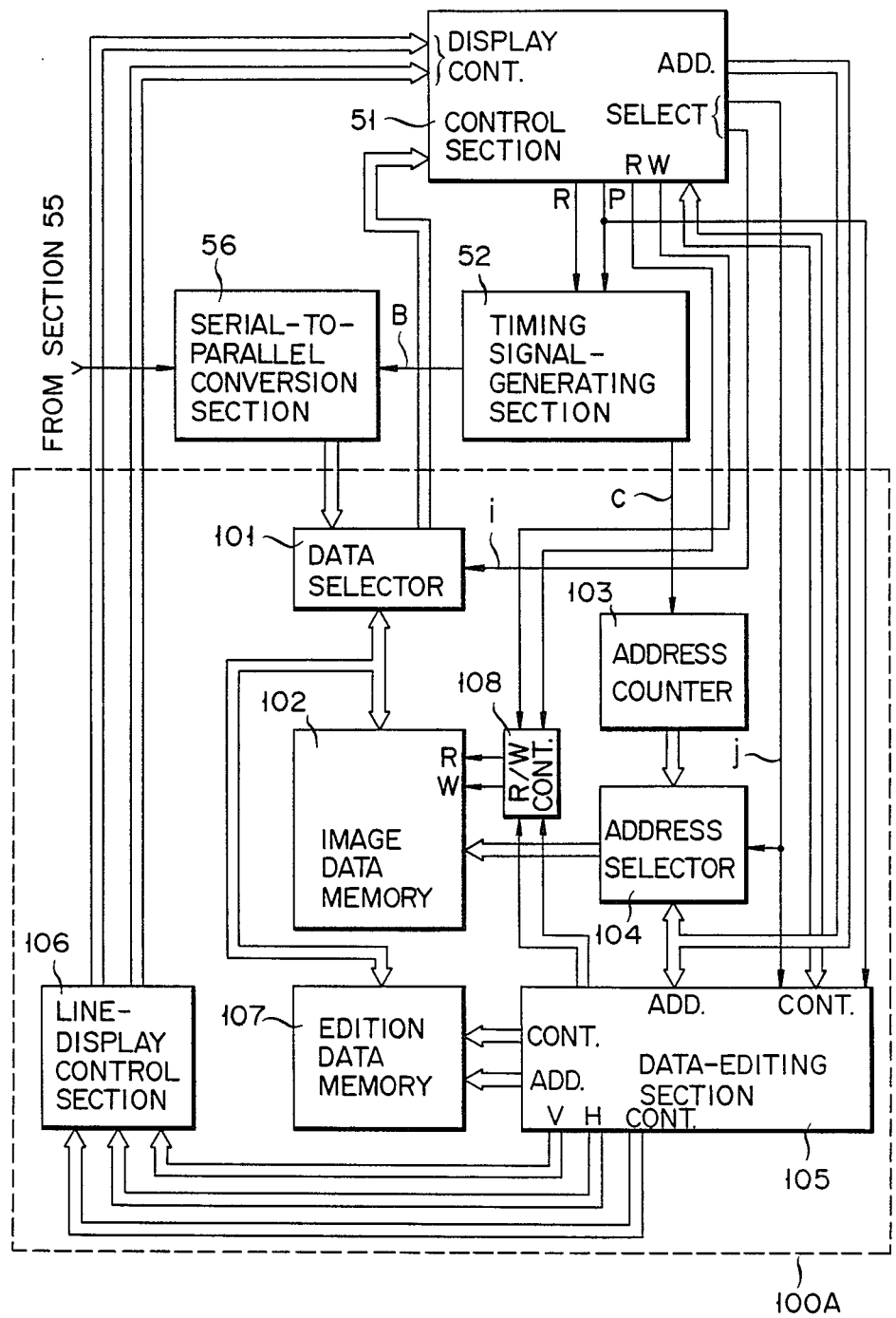
F I G. 13

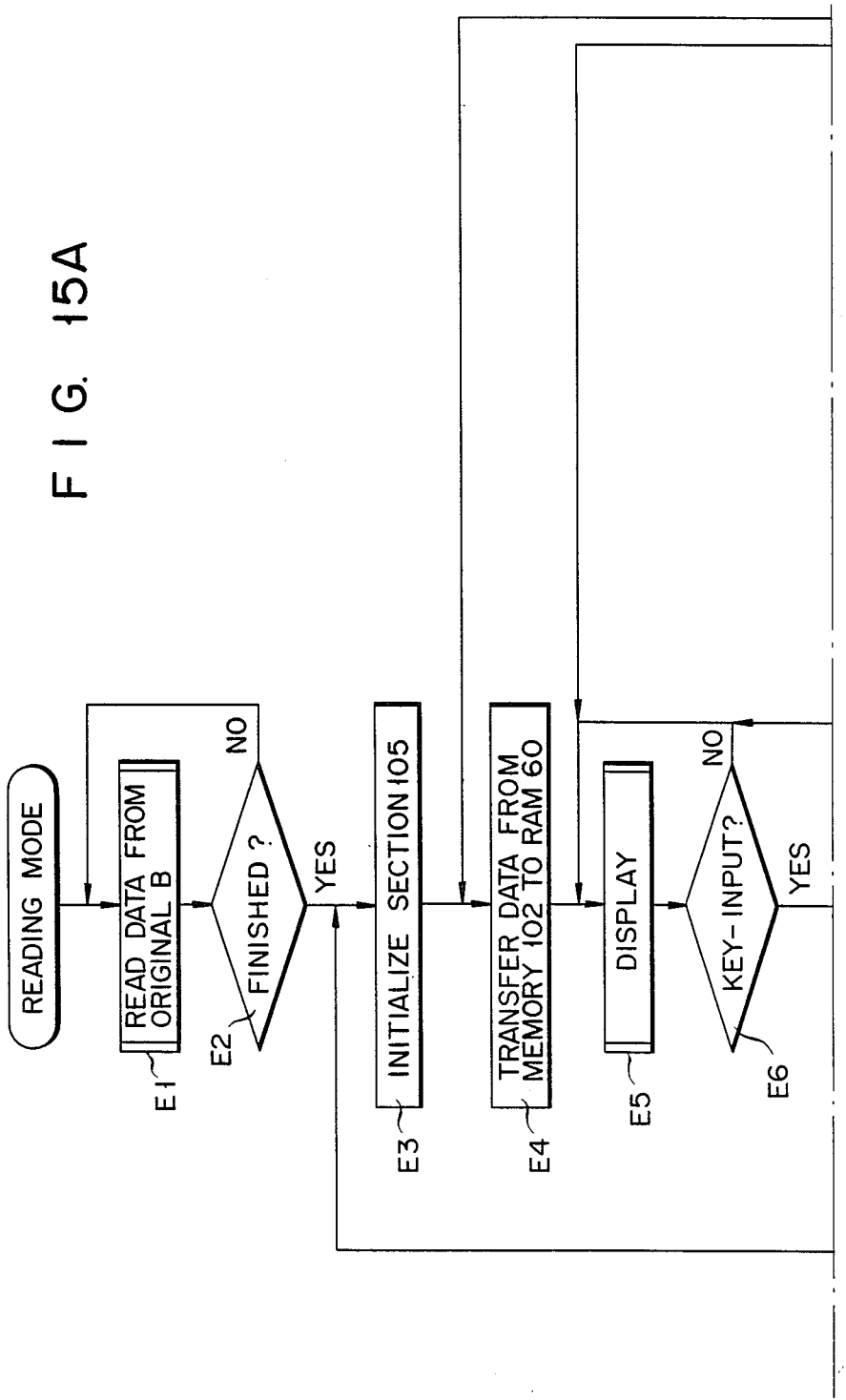

F I G. 24A
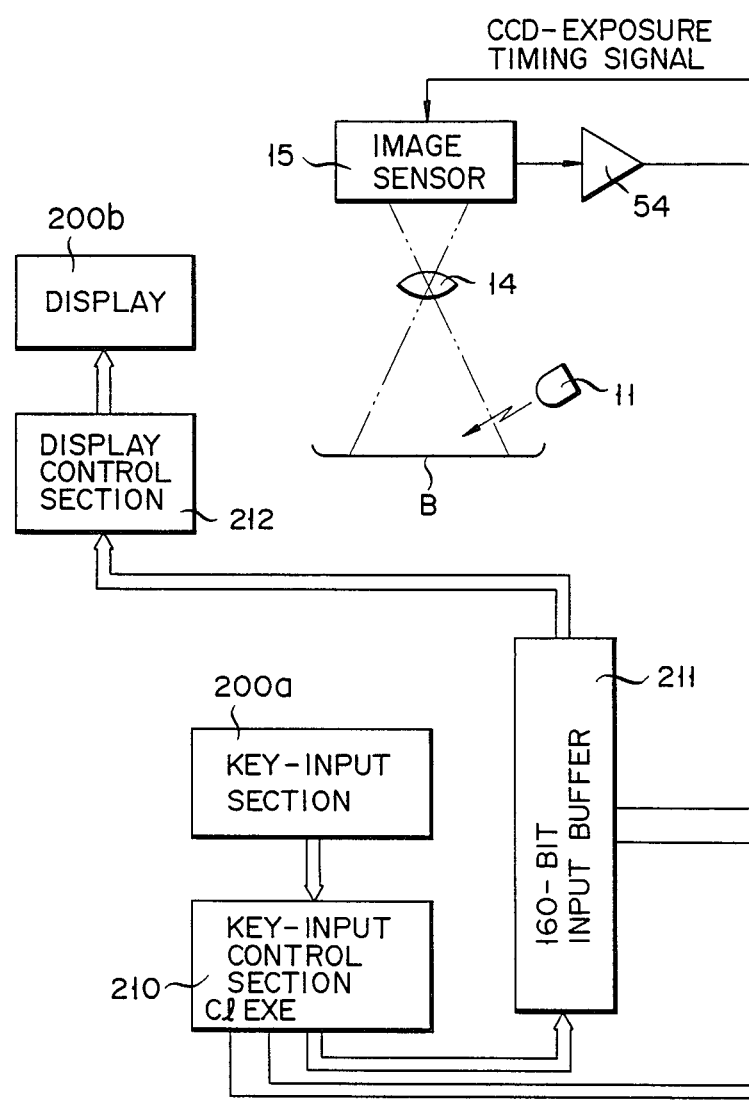

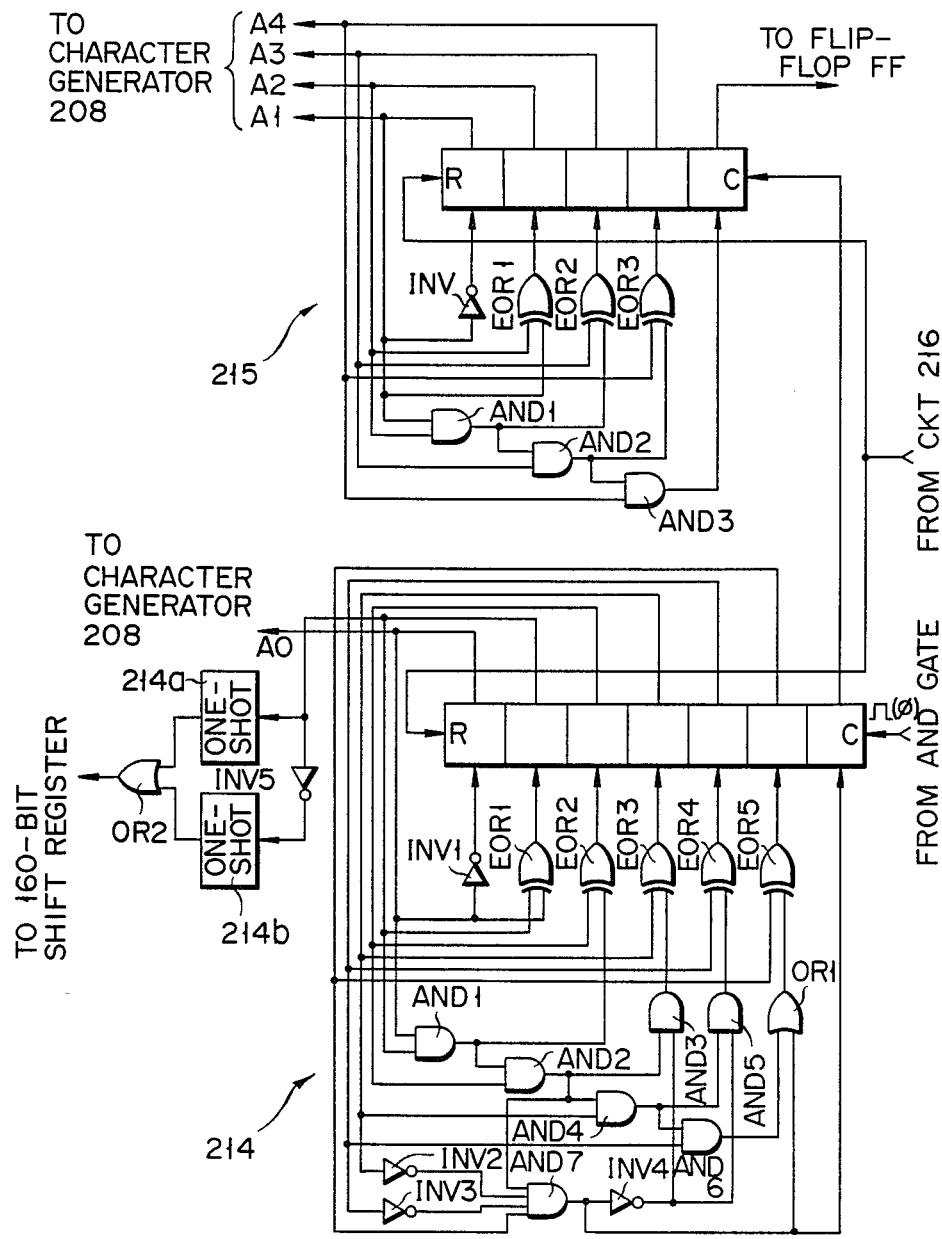
F I G. 25

MANUAL SWEEPING APPARATUS

BACKGROUND OF THE INVENTION

The present invention relates to a manual sweeping apparatus which can be manually swept over an original, thereby to read image information from the original, and can output the image thus read from the original.

Japanese Patent Disclosure No. 55-115773 (Applicant: Kabushiki Kaisha Ricoh; Inventors: Seiiti Namakura and Yojiro Sato) discloses a manual sweeping copier. This copier is manually swept over an original, thus reading image information from the original. The image information, thus read, is stored into the memory provided within the copier. The copier is then manually moved across a piece of paper, thereby reading the image information from the memory and printing it on the piece of paper.

Copiers of this type are useful particularly in copying parts of newspaper articles, magazine articles, and the like, thereby to prepare scrapbooks, or in copying desired portions of maps, thereby preparing information maps.

When a desired part of an article or a map is copied, it is usually desirable that data, such as the publishing date of the article or the destination, be added to the copied information.

With the conventional manual sweeping copier it is impossible to print such additional data, along with the desired pat of an article or a map. Therefore, people must write the data on the sheet of paper after the desired part of the article or the map has been copied thereon.

SUMMARY OF THE INVENTION

Accordingly, the object of the present invention is to provide a manual sweeping apparatus which can read information from an original and output the information together with additional information.

To attain this object, there is provided a manual sweeping apparatus including a manually movable housing. The housing comprises: input means for producing image information signals while the housing is manually swept across a material having image information; position-detecting means for detecting the position of said housing being swept across the material, thereby to produce a signal every time the housing is swept over a predetermined distance, the signal representing the position of the housing with respect to the material; character-generating means for generating character pattern signals; signal-combining means for combining the image information signals produced by the input means with the character pattern signals generated by the character-generating means and output means for outputting the signals combined by the signal-combining means.

The manual sweeping apparatus of this invention can, therefore, read image information such as a part of a newspaper article or a part of a map, and can output the image information thus read, along with additional information such as publishing date of the article and the title thereof, or the destination and the route to this destination. The apparatus of the present invention can thus be said to be useful in preparing scrapbooks or information maps.

BRIEF DESCRIPTION OF THE DRAWINGS

FIGS. 4A to 4C are block diagrams showing the electronic circuit provided within the hand-held copier;

FIGS. 12A to 12C are block diagrams showing the electronic circuit provided within the hand-held copier; of FIG. 11;

FIG. 13 is a block diagram illustrating the image data storage/processing section of the hand-held copier, and the peripheral circuits of this section;

FIGS. 15A and 15B are flow charts explaining how the hand-held copier is operated to read information;

FIGS. 24A to 24C are block diagrams illustrating the electronic circuit incorporated in the hand-held copier of FIG. 23;

FIG. 25 is a circuit diagram showing the scale-of-40 counter and the hexadecimal counter, both shown in FIGS. 24A to 24C;

DETAILED DESCRIPTION OF THE PREFERRED EMBODIMENTS

Figure 1:
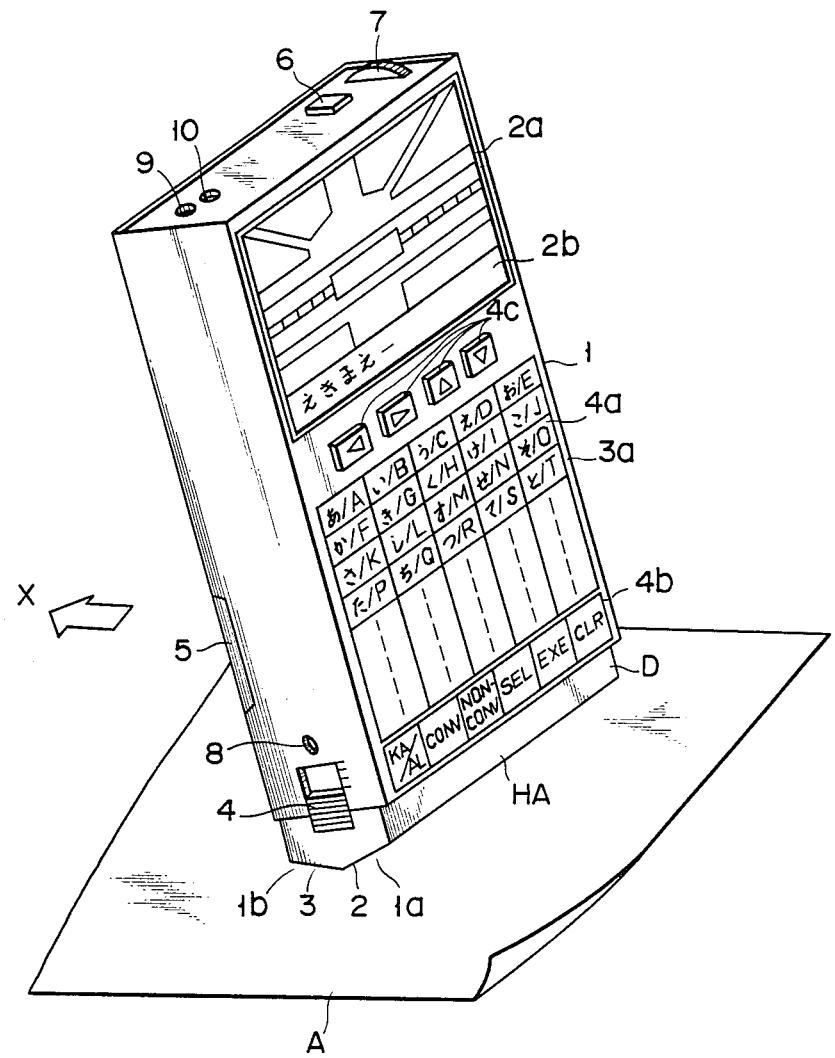
FIG. 1 is a perspective view of a hand-held copier according to one embodiment of the present invention.

One embodiment of the present invention, i.e., a hand-held copier, will now be described in detail. FIG. 1 is a perspective view showing the outer appearance of the hand-held copier. The hand-held copier has housing 1, which is 70 mm wide, 30 mm deep, and 160 mm long. The copier can read and print an image having a maximum width of 40 mm, and can store data representing an image having a maximum width of 40 mm and a maximum length of 200 mm. It can read an image in the resolution of 8 dots/mm at most, and can print ink dots in the density of 8 dots/mm at most.

Head section HA is attached to the distal end (or the lower end) of housing 1. Head section HA, which is designed to read an image from an original and also to print the image on a sheet of paper A, is narrower and thinner than housing 1. Therefore, stepped portion D is formed between head section HA and housing 1. The distal end of head section HA consists of two long, narrow, inclined surfaces 1a and 1b, which are jointed on their lower sides, thus forming a ridge. Reading section 2 is provided in surface 1a, and printing section 3 is provided in surface 1b. Mode-selecting switch 4 is provided on one side of housing 1, and located at the lower end of this side. Operation switch 5 is arranged on the rear surface of housing 1. This switch 5 is shaped like a plate. Operation switch 5 and the front surface of housing 1 are held between the user's thumb and fingers, so that the user may move the hand-held copier back and forth. Mode-selecting switch 4 is operated to turn the copier on or off, and to set the copier in a reading mode, a key-input mode, or a printing mode. More precisely, when switch 4 is operated to set the copier in the reading mode, the key-input mode, or the printing mode, the copier is automatically turned on. Further, clear key 6, and density control dial 7 are provided on the proximal (or upper) end of housing 1. Clear key 6 is pushed to clear the contents of an image memory (later described in detail) when the hand-held copier is set in the reading mode, and to initialize the address of the image memory when the copier is set in the printing mode. LED 8 is provided near switch 4. LEDs 9 and 10 are arranged on the proximal end of housing 1. LED 8 is a power-supply pilot lamp, LED 9 is a memory pilot lamp, and LED 10 is an alarm lamp.

Display sections 2a and 2b and key-input section 3a are provided on the front surface of housing 1. Key-input section 3a has character/symbol keys 4a, function keys 4b, and movement keys 4c, which are arranged in a specific pattern. Character/symbol keys 4a are operated to input Japanese "kana" letters, Roman letters, numerals, and symbols. Function keys 4b include: an execution key for initiating the inputting of each piece of data; a kana/alphabet key for inputting kana letters or the inputting of Roman letters and numerals; a kana/Chinese character conversion key for converting the input kana letters to Chinese characters; a selection key for selecting one of several Japanese homonyms spelt in Chinese characters; a non-conversion key for storing kana letters into a memory, without converting them to Chinese characters; and a clear key for erasing the data displayed by display sections 2a and 2b. Movement keys 4c includes keys for moving the cursor in display section 2a, up, down, left, and right. Upper display section 2a is 40 mm wide and 40 mm long. Its width is equal to the maximum width of an image that can be read and print by the hand-held copier. Its length is a fifth the maximum length of the image the hand-held copier can read and print. The image displayed by upper display section 2a can be horizontally scrolled for the distance of 200 mm. Lower display section 2b displays a line of letters, characters, numerals and symbols as these items of data are input by operating keys 4a and 4b. Upper display section 2a display an image which is a combination of the image information obtained by sweeping of this copier and the key-in data displayed in display section 2b.

In order to read image information from an original by the hand-held copier, mode-selecting switch 4 is moved to a "read" position, whereby the copier is turned on, and LED 8 emits light. The user holds the copier and sweeps it across the original, while depressing operation key 5 and keeping reading section 2 in contact with the original. As the hand-held copier is moved in this way, reading section 2 reads the image information from the original. The image information is displayed by upper display section 2a. When the user sweeps the copier across the original at a speed higher than the predetermined value, LED 10 emits light, thereby informing the user of this fact.

To input data by operating key-input section 3a, mode-selecting switch is moved to a "key-input" position. Then, character/symbol keys 4a and function keys 4b are selectively operated, thereby inputting desired character data. This data is displayed by lower display section 2b, and also at that position of upper display section 2a where a cursor is displayed. The cursor is moved by operating keys 4c.

To print the image data and the key-in data, combined together, mode-selecting switch 4 is moved to a "print" position. Then, the user holds the hand-held copier and sweeps it across a piece of ordinary paper A in the direction of arrow X (FIG. 1), while depressing operation switch 5 and keeping printing section 3 in contact with paper A. As a result, the combined information is printed on paper A.

Reading section 2 and printing section 3, both provided within housing 1, will now be described in detail, with reference to FIGS. 2A and 2B and FIG. 3.

Figure 2A:
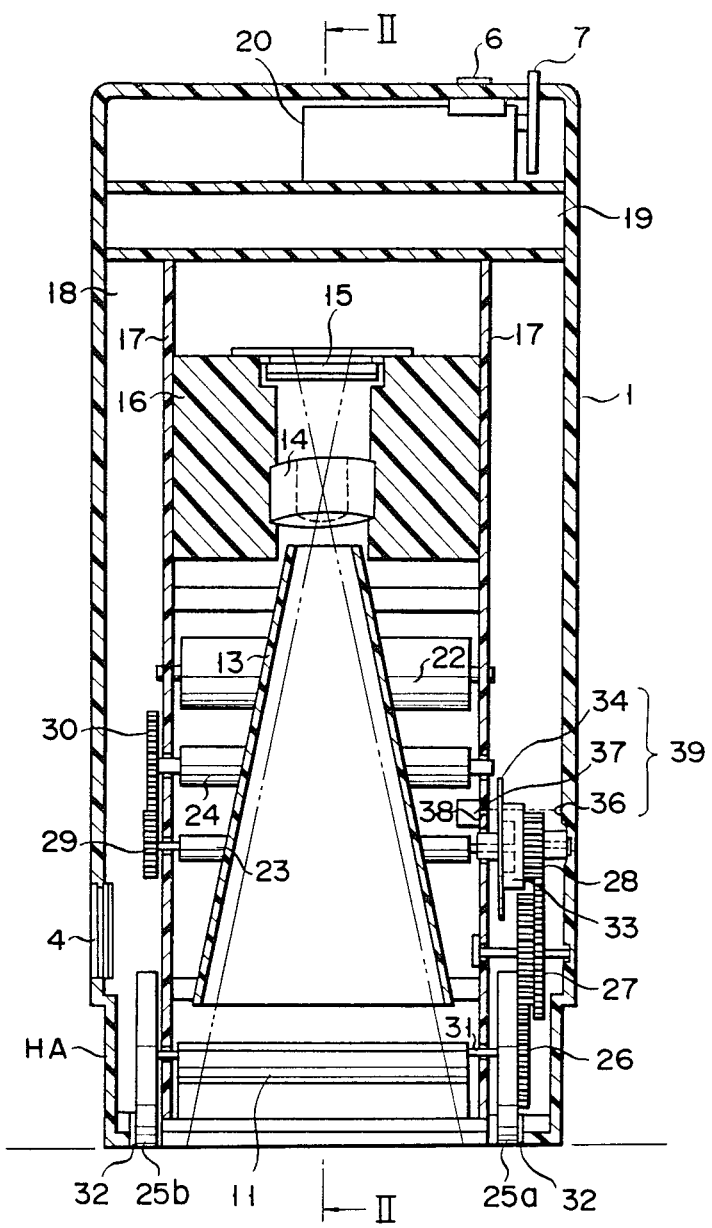
FIG. 2A is a sectional view showing the internal structure of the hand-held copier shown in FIG. 1.
Figure 2B:
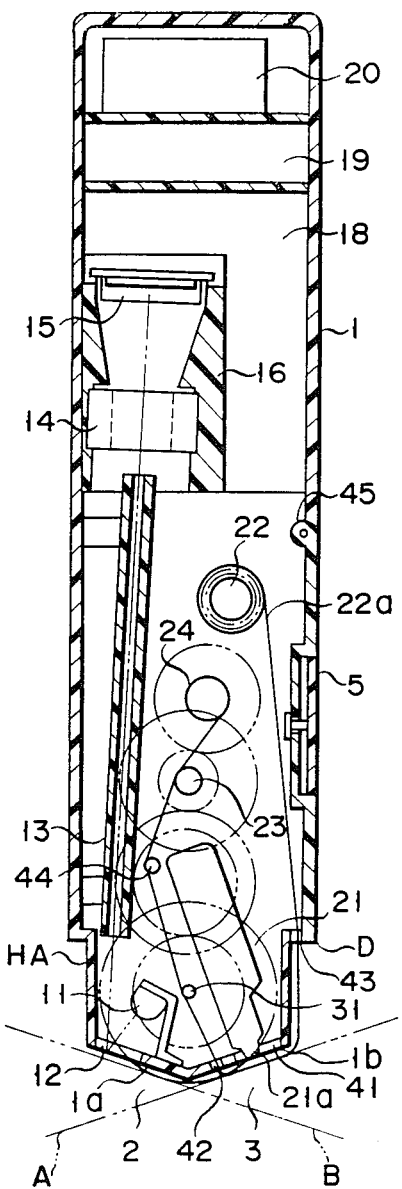
FIG. 2B is also a sectional view of the hand-held copier, taken along line II—II in FIG. 2A.

As is shown in FIGS. 2A and 2B, reading section 2 comprises light source 11 located close to inclined surface 1a, reading window 12 cut in inclined surface 1a, light guide 13, lens 14 located above guide 13, and line image sensor 15 provided above lens 14. Light source 11 includes an array of LEDs. The light emitted from light source 11 is applied to original B through reading window 12. The light reflected from original B is guided by light guide 13 to lens 14 and then to image sensor 15. Line image sensor 15 is, for example, a 1024- bit CCD line image sensor. Of the 1024 bits, 320 bits are used for reading an image having a maximum width of 40 mm, in a resolution of 8 dots/mm. Lens 14 and line image sensor 15 are held in specified positions by supporting member 16. The supporting member 16 is fastened to inner frame 17 provided within housing 1, and is spaced apart from the inner surfaces of housing 1 by a predetermined distance. Space 18, accommodating electronic parts (later described), is provided in housing 1, on one side of supporting member 16. Space 19, accommodating a battery, is also provided in housing 1, and is located above supporting member 16. Line image sensor 15, display sections 2a and 2b, key-input section 3a, and the like, are connected to a circuit board (not shown) arranged in space 18. Clear key 6 and density control dial 7 are also coupled to the circuit board.

Within inner frame 17, there are provided thermal head 21, ink ribbon roll 22, ribbon-feeding roller 23 for feeding ribbon 22a, and ribbon take-up roller 24. Rubber rollers 25a and 25b, and gears 26 to 30 are arranged in the gap between inner frame 17 and the inner surfaces of housing 1. Rollers 25a and 25b are rotatably mounted on shaft 31 which extends horizontally across inner frame 17 and protrudes at both ends from inner frame 17. They are positioned such that parts of their peripheries slightly project outwardly through slits 32 cut in the end portions of inclined surfaces 1a and 1b. Gear 26 is coaxially secured to rubber roller 25a. Gear 26, which has a smaller diameter than rubber roller 25a, is coupled by intermediate gears 27 to gear 28. Gear 28 is connected by clutch 33 to the shaft of ribbon-feeding roller 23. Clutch 33, which is of a one-way type, transmits the rotation of gear 28 to ribbon-feeding roller 23 only when the user sweeps the hand-held copier across paper A to print image information thereon.

Encoder disk 34 is fastened to the input-end of clutch 33. Encoder disk 34 can rotate, independently of the operation of one-way clutch 33, when gear 28 rotates. As is shown in FIG. 3, disk 34 has a number of radial slits 35 spaced apart at equal intervals in the circumferential direction of disk 34. LED 36 is provided at one side of disk 34, and photosensor 37 is located at the other side of disk 34. As is illustrated in FIG. 2A, LED 36 is secured to the inner surface of housing 1, and photosensor 37 is fastened to the inner surface of inner frame 17. Through hole 38 is cut in frame 17, positioned coaxially with photosensor 37. Hence, the light emitted from LED 36 can be applied to photosensor 37 through slits 35 of disk 34 and through this hole 38. Encoder disk 34, LED 36, and photosensor 37 constitute encoder 39.

Figure 3:
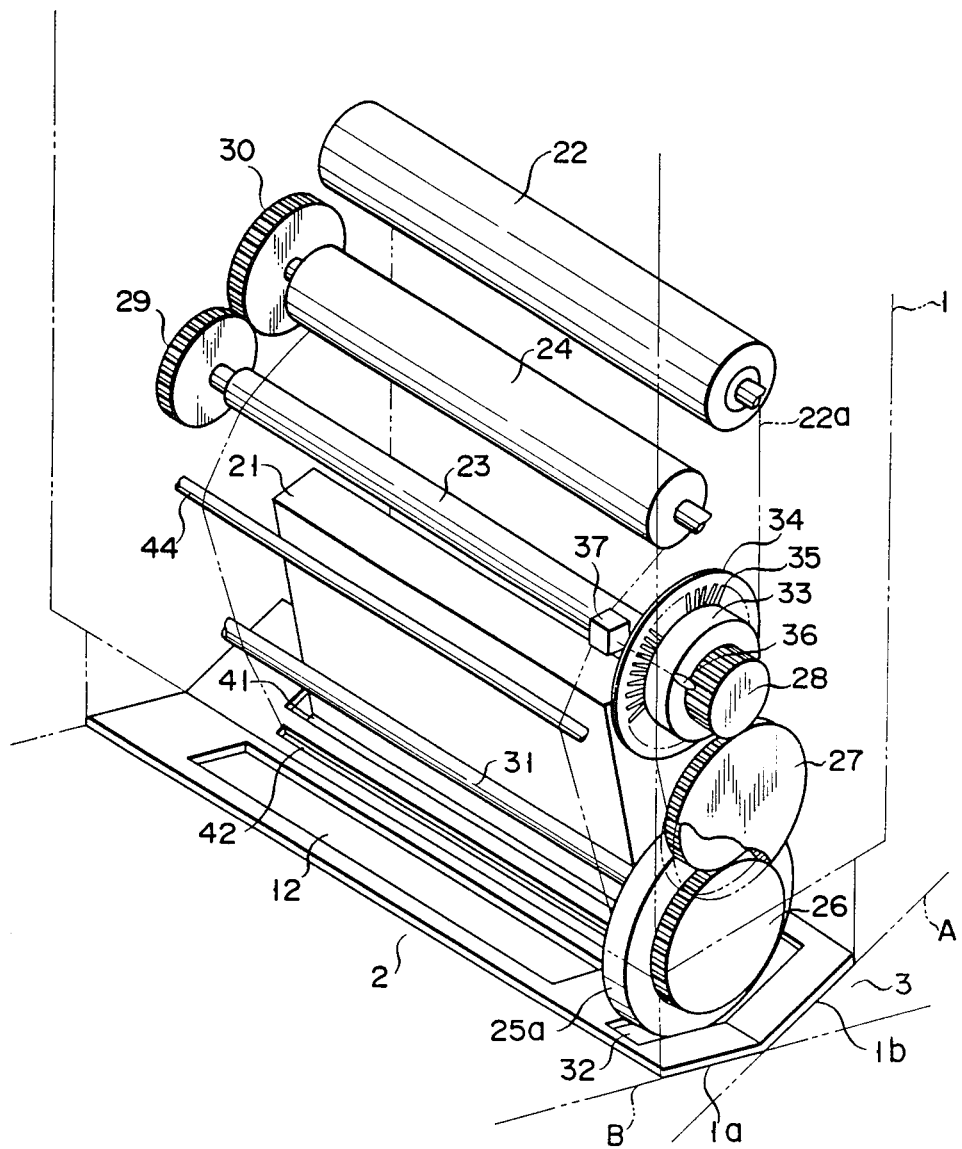
FIG. 3 is a perspective view showing the major components forming the internal structure of the hand-held copier.

As is shown in FIG. 3, printing window 41 and ribbon-guiding window 42, both being elongated slits, are made in inclined surfaces 1b and extend parallel to each other. Ribbon-guiding window 42 is located closer to a top of inclined surface portion formed by inclined surfaces 1a, 1b than printing window 41. Thermal head 21 has heating section 21a, which is inserted in printing window 41. Heating section 21a slightly protrudes from inclined surface 1b. As is shown in FIG. 2B, slit 43 is cut in stepped portion D, near that rear side of housing 1 on which operation switch 5 is mounted. Thermal-transfer ink ribbon 22a fed from roll 22 is let out of housing 1 through slit 43, and then guided into housing 1 through ribbon-guiding window 42 after passing heating section 21a of thermal head 21. Within housing 1, ink ribbon 22a is guided by shaft 31, ink ribbon guide 44 and ribbon-feeding roller 23, and is finally taken up around take-up roller 24.

As is illustrated in FIG. 2B, the lower half of that side of housing 1 on which operation switch 5 is mounted can be opened when pivoted around hinge 45. When the lower half of this side is open, used ribbon roll 22 can be replaced with a new one, and the interior of housing 1 can be inspected.

Figure 4B:
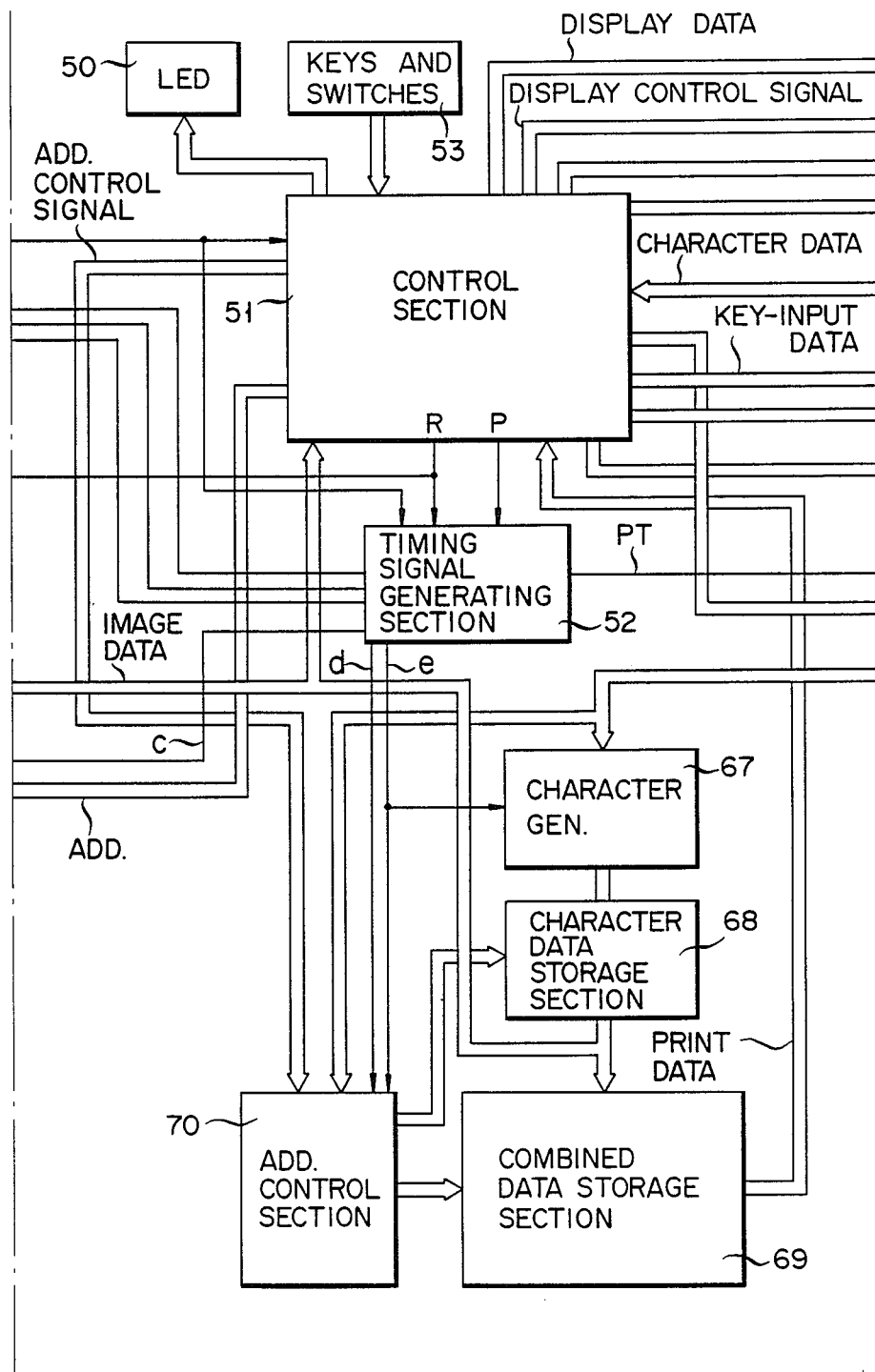

The electronic circuit mounted on the circuit board provided in space 18 will now be described with reference to FIGS. 4A to 4C.

As has been described, encoder 39 comprises encoder disk 34, LED 36, and photosensor 37. When the user sweeps the hand-held copier across original B or paper A, while keeping reading section 2 or printing section 3 in contact with original B or paper A, rubber rollers 25a and 25b are rotated As a result encoder disk 34 is rotated. As disk 34 rotates, the light emitted from LED 36 is intermittently applied to photosensor 37 through radial slits 35 of disk 34. Every time photosensor 37 receives the light, it produces a pulse. Hence, encoder 39 generates a signal consisting of these pulses. This pulse signal represents the distance over which the hand-held copier has been moved across original B or paper A. The pulse signal is supplied from encoder 39 to control section 51, and timing signal-generating section 52, both arranged within the electronic circuit.

Various operation signals are supplied to control section 51 from mode-selecting switch 4, operation switch 5, character/symbol keys 4a, function keys 4b, clear key 6, and density control dial 7. All these switches and keys will be hereinafter generally referred to as "switches 53." Control section 51 comprises, for example, a general-purpose microcomputer chip. It is provided with a power-source voltage detector (not shown). In response to the operation signals supplied from switches 53, control section 51 controls LEDs 8 and 9, i.e., LED section 50, and the other components of the hand-held copier. When the copier is set in the reading mode, control section 51 supplies an operation command R to timing signal-generating section 52. When the copier is set in the printing mode, section 51 supplies an operation command P to timing signal-generating section 52.

In response to operation command R from control section 51, timing signal-generating section 52 generates a CCD-exposure timing signal representing the timing at which the CCD elements of line image sensor 15 are exposed to light. Section 52 also produces signals in synchronism with the pulses output by encoder 39, such as read-timing signal "a", serial-to-parallel conversion signal "b", and clock pulses "c". Further, it generates data-transfer sync clock signals "d" and "e" and a print-timing signal PT in response to operation command P supplied from control section 51.

The CCD-exposure timing signal output by timing signal-generating section 52 is supplied to line image sensor 15. Read-timing signal "a" is supplied to binary encoding section 55. Serial-to-parallel conversion signal "b" is input to serial-to-parallel conversion section 56. Clock pulses "c" are supplied to address control section 58.

Line image sensor 15 receives the light reflected from original B, in synchronism with the pulses of the CCD-exposure timing signal and generates an electric signal. This electric signal is supplied via amplifier 54 to binary encoding section 55. Section 55 converts the input signal into binary signals, each representing either "black" or "white", in synchronism with the pulses of read-timing signal "a". The binary signals are input to serial-toparallel conversion section 56. Section 56 converts the binary signals into, for example, an 8-bit parallel signal. The 8-bit parallel signal is supplied to image data storage section 57, at the write address which has been designated by address control section 58. Each write address of image data storage section 57 consists of a row address and a column address.

When the hand-held copier is set in the key-input mode, by operating mode-selecting switch 4, control section 51 controls key-input data storage section 59, display data RAM 60, kana-to-Chinese character conversion section 61, character storage section 62, text data memory 63, and address control section 64.

When the user selectively depresses character/symbol keys 4a and function keys 4b of key-input section 3a, the character-symbol data representing alphabet letters, numeral, kana letters, symbols, and the like, is stored into key-input data storage section 59. The character-symbol data is supplied to character generator 66. Character generator 66 generates pattern data representing the alphabet letters, kana letters, symbols, and the like, which have been input by operating key-input section 3a. This pattern data is stored in display data RAM 60 and then displayed by display sections 2a and 2b. Assume that Kana letters have been input. Kana-to-Chinese character conversion section 61 converts the Kana letters to Chinese characters in response to the operation of conversion key, i.e., one of function keys 4b. Kana-to-Chinese character conversion section 61 includes a dictionary memory (not shown). The dictionary memory stores phrases written in Kana letters, phrases written in Chinese characters, words written in Kana letters, words written in Chinese characters, combinations of Kana letters, and Chinese characters. First kana-to-Chinese character conversion section 61 search the dictionary memory for phrases in Chinese characters which seem to correspond to each phrase written in kana letters. If one or more phrases in Chinese characters, are found in the dictionary memory, they are stored in character storage section 62. Then, section 61 searches the dictionary memory for words written in Chinese characters which seem to correspond to each word input in kana letters. If one or more words written in Chinese characters are found in the dictionary memory, they are stored in character storage section 62. Next, section 61 searches the dictionary memory for Chinese characters which seem to correspond to any combination of the kana letters input by operating character/symbol keys 4a. If one or more Chinese characters are found in the dictionary memory they are stored in character storage section 62. If there are various possibilities written in Chinese characters, which are stored in character storage section 62, one selected possibilities is displayed by display section 2b. When the desired possibility is displayed, the user pushes the selection key, i.e., another function key 4b. Then, control section 51 supplies a character-selecting signal to character storage section 62. As a result, the desired possibility, e.g., one of the homonyms spelt in Chinese characters, or one of the homonymic Chinese characters, is written into text data memory 63. When an undesired possibility is displayed, the user pushes the conversion key agains, thus another possibility is displayed. The kana letters, which need not be converted to Chinese characters, alphabet letters, and the symbols, if any, which have been input by operating key-input section 3a, are transferred to text data memory 63 and written therein. Therefore, text data memory 63 stores character data representing Chinese Characters, Japanese kana letters, alphabet letters symbols, and so on. Kana-to-Chinese character conversion section 61 can convert input alphabet (Roman character) to corresponding Chinese characters or Kana letters.

Text data memory 63 has a memory capacity whose addresses correspond to image data storage section 57 and also to combined data storage section 69 (later described in detail). Image data storage section 57 has a memory capacity for storing an image having a maximum width of 40 mm and a maximum length of 200 mm. When characters, each having a size of 4×4 mm, are to be printed, text data memory 63 has a memory capacity for storing 10 (lines)×50 (digits) text. The character data is stored in text data memory 63 is displayed in upper display section 2a, at the position indicated by the cursor, along with the image data which has been read out of image data storage section 57.

Assume that the hand-held copier is set to the printing mode after the original image has been read, and the character data has been input. Then, control section 51 outputs operation command P to timing signal-generating section 52. The image data is first transferred from image data storage section 57 to combined data storage section 69, in accordance with the readout address data supplied from address control section 58. The character data is then read out of text data storage section 63 in accordance with the readout address data supplied from address control section 64, and supplied to character generator 67. Character generator 67 converts this data to character pattern data, which is temporarily stored in character data storage section 68 20 and then transferred to combined data storage section 69. Hence, the image data and the character data are combined and stored in combined data storage section 69. Any address of character data storage section 68, and any address of combined data storage section 69 are designated by address control section 70. Character data storage section 68 stores one line of character data supplied from text data memory 63 through character generator 67, and transfers the character data, byte by byte, to combined data storage section 69.

Figure 5:
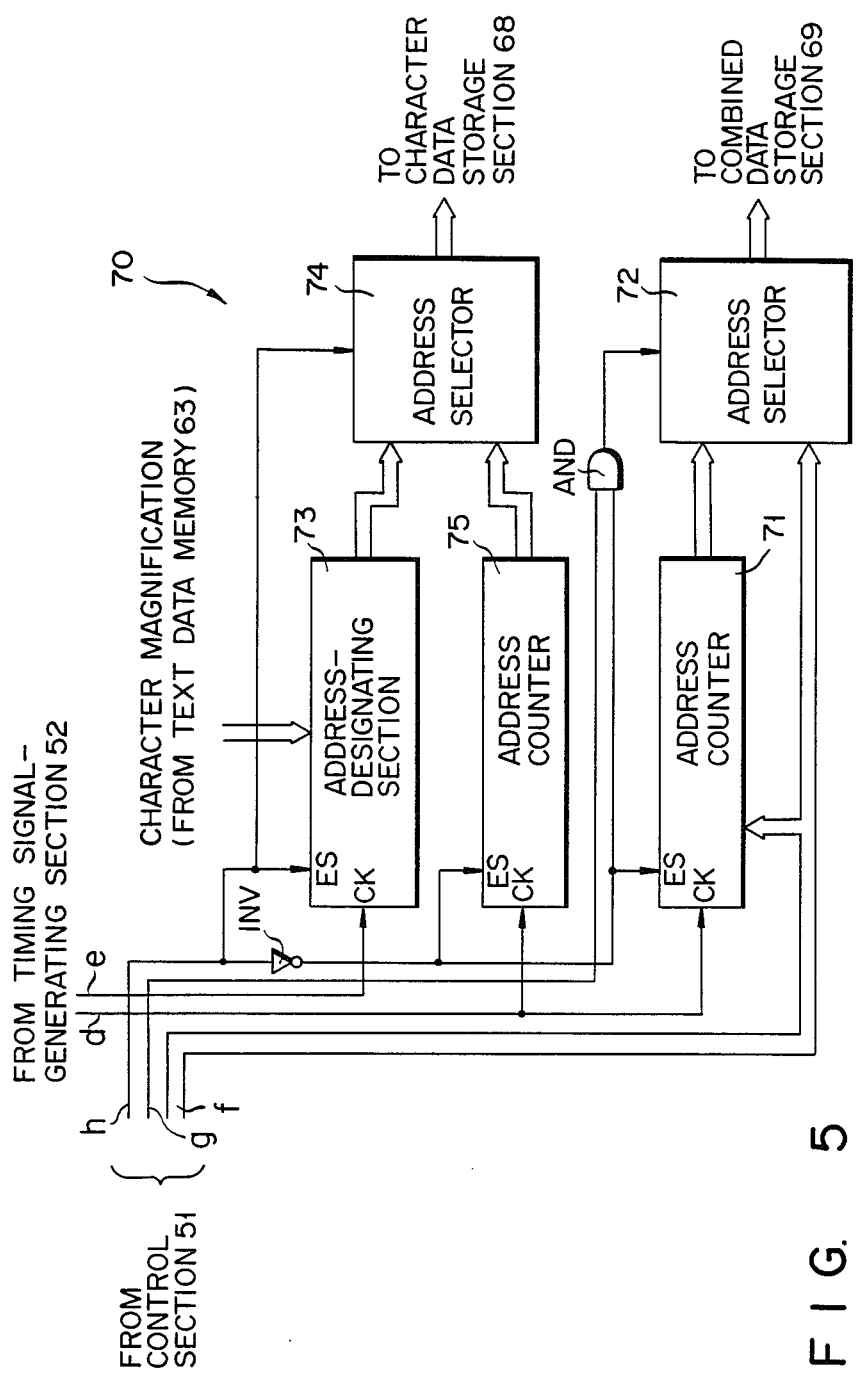
FIG. 5 is a block diagram showing the address control section provided within the hand-held copier, for combining pieces of data which are to be transferred.

FIG. 5 schematically shows address control section 70 which is designed to combine character data with image data. As is shown in this figure, section 70 comprises address counter 71, address selector 72, address-designating section 73, address selector 74, and address counter 75. Counter 71 and selector 72 cooperate to designate any address of combined data storage section 69, thereby to write data into, and read data from, this designated address. Address-designating section 73, address selector 74, and address counter 75 cooperate to designate any address of character data storage section 68, thereby to write character data into, and read character data from, the designated address of storage section 68., Address control section 70 further comprises an AND gate and an inverter INV. Address bus "f" are coupled to control section 51, address counter 71 and address selector 72. A readout signal "h", which will be used to read data from character data storage section 68, is supplied from control section 51 to the first input of the AND gate through the inverter INV. A read/write signal "g", which will be used to read data from, and write data into, combined data storage section 69, is supplied from control section 51 to the second input of the AND gate. The output of the AND gate is input to address selector 72. The readout signal "h" is also supplied to address-designating section 73 and address selector 74. A transfer sync clock signal "d" is supplied from timing signal-generating section 52 to address counter 71 and also to address counter 75. Further, sync clock signal "e" for synchronizing character generator 66 is supplied from timing signal-generating section 52 to address-designating section 73. A character magnification signal, which represents the magnification in which each character should be printed, is supplied to address-designating section 73 when the character data is transferred from text data memory 63.

After the image data supplied from image data storage section 57 and the character data transferred from text data memory 63 have been combined and stored in combined data storage section 68, the combined data is supplied as print data to control section 51 in response to a pulse signal, from encoder 39, representing the movement of the hand-held copier. Control section 51 calculates the period for supplying power to thermal head 21, from the temperature of head 21, the power-supply voltage detected by the voltage detector, and the density selected by rotating density control dial 7. This done, control section 51 outputs the print data to thermal head drive section 65. Drive section 65 drives thermal head 21 in accordance with the print data, in synchronism with print timing signal PT supplied from timing signal-generating section 52.

The operation of the embodiment described above will now be explained.

Figure 6:
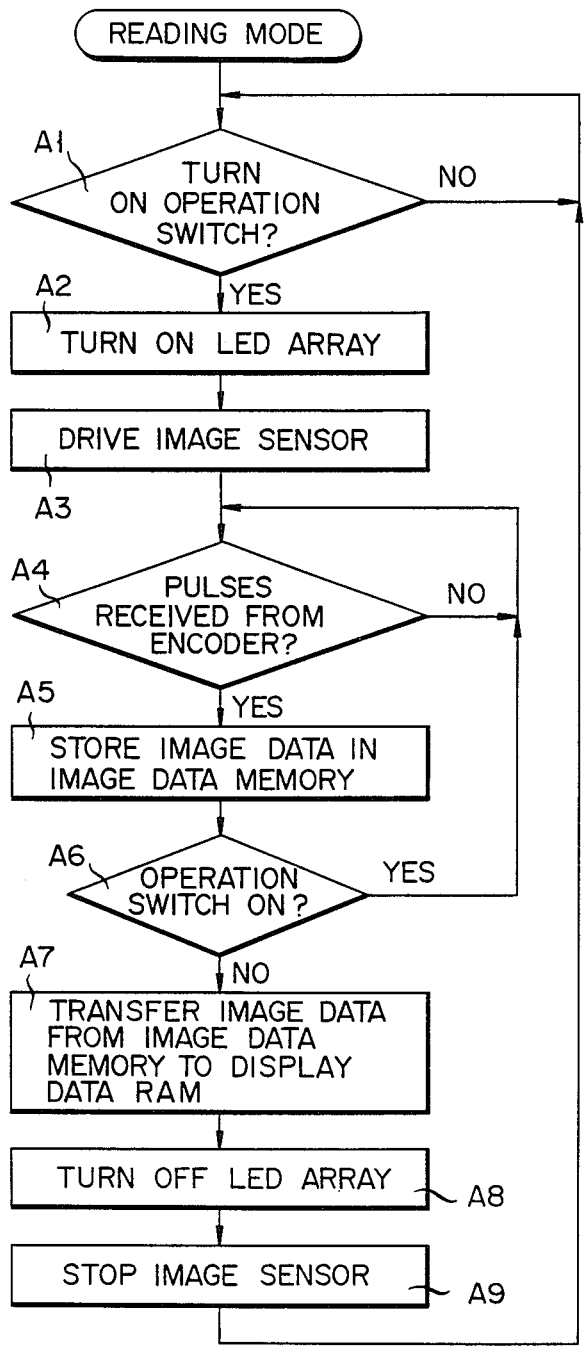
FIG. 6 is a flow chart explaining how the hand-held copier is operated to read image data.

First, it will be explained how the hand-held copier is operated to read image data from original B, with reference to the flow chart of FIG. 6. The user moves mode-selecting switch 4 from a "power off" position to the "read" position. Therefore, power is supplied to the electronic circuit of the hand-held copier. Control section 51 turns on LED 8 of LED section 50, thereby informing the user that the electronic circuit has been turned on. Control section 51 gives operation command R to timing signal-generating section 52. Then, the user sweeps the hand-held copier across original B in the direction opposite to arrow X (FIG. 1), while keeping reading section 2 (FIG. 2B) in contact with original B and depressing operation switch 5 (Step A1). The light emitted from light source 11 is applied to original B through reading window 12 cut in inclined surface 1a. The light is reflected from original B, guided by light guide 13, and applied through lens 14 to line image sensor 15 (Step A2).

As the hand-held copier is swept across original B, rubber rollers 25a and 25b, both contacting original B, rotate. Gears 26, 27, and 28 are, therefore, rotated. As a result, encoder disk 34 coupled to gear 28 rotates at a speed proportionate to the speed at which the user is sweeping the copier across original B. As encoder disk 34 rotates in this manner, the light emitted from LED 36 is intermittently applied to photosensor 37 through radial slits 35 of encoder disk 34. Photosensor 37 generates a pulse signal. The pulse signal, i.e., the output signal of encoder 39, which represents the distance the copier has been moved across original B, is supplied to control section 51 and also to timing signal-generating section 52.

Meanwhile, when operation command R is input to timing signal-generating section 52, section 52 starts supplying CCD-exposure timing pulses at regular intervals to line image sensor 15. Further, section 52 generates read-timing signal "a" and serial-to-parallel conversion signal "b" in accordance with the output signal of encoder 39 which shows the distance the hand-held copier has been moved cross original B. Read-timing signal "a" is input to binary encoding section 55, and serial-to-parallel conversion signal "b" is input to serial-to-parallel conversion section 56 (Steps A3 and A4). Timing signal-generating section 52 generates clock pulses "c" in synchronism with serial-to-parallel conversion signal "b". Clock pulses "c" are supplied to address control section 56.

Line image sensor 15 produces image signal from the light reflected from original B, in synchronism with the CCD-exposure timing signals output from timing signal-generating section 52. The image signal is amplified by amplifier 54 and then supplied to binary encoding section 55. Binary encoding section 55 converts the image signal to a digital signal, in synchronism with read-timing signal "a". The digital signal is input to serial-to-parallel conversion section 56. Section 56 converts the digital signal to parallel image data, or items of 8-bit parallel data, in synchronism with serial-to-parallel conversion signals "b". The parallel image data is input to image data storage section 57 (Step A5). The addresses of image data storage section 57 can be designated by address control section 58. More specifically, it increments the column address of section 57 by "+1" every time it receives a clock pulse "c" from timing signal-generating section 52. Timing signal-generating section 52 stops producing timing signals when image data of one line is written into image data storage section 57. It generates no timing signals until it receives a pulse from encoder 39. The sequence of the operations described above is repeated, whereby the image data read from original B is written into image data storage section 57 (Steps A4, A5 and A6).

After the image data read from original B has been stored into image data storage section 57, operation switch 5 is turned off. Then, the data image is transferred from section 57 to display data RAM 60 through control section 51, and is displayed on upper display section 2a (Step A7). Control section 51 stops outputting operation command R to timing signal-generating section 52. As a result, light source 11 is turned off. And section 52 stops generating CCD-exposure signals. As a result line image sensor 15 stops operating (Step A8).

Figure 7:
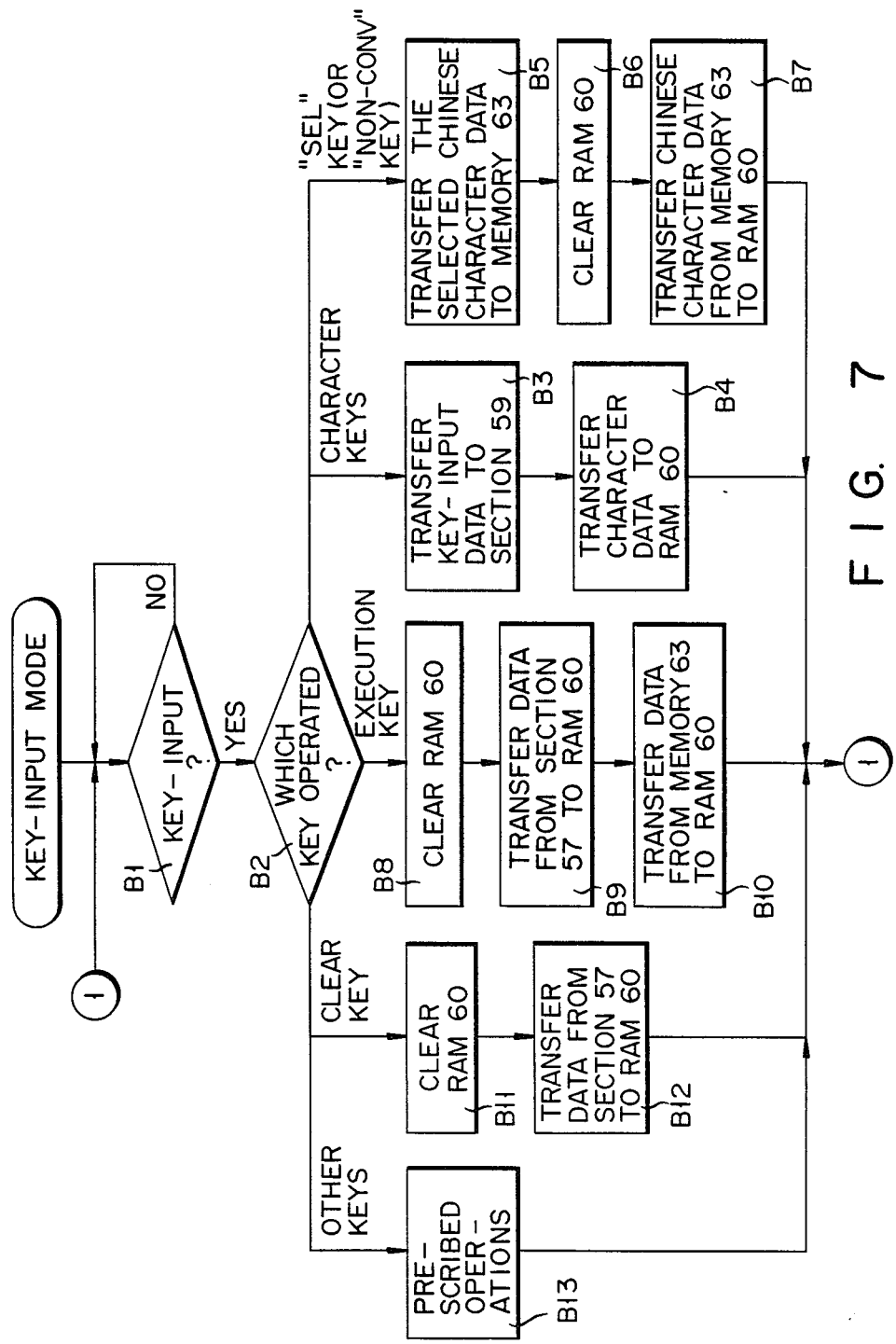
FIG. 7 is a flow chart how the hand-held copier is operated to input data.
Figure 8A:
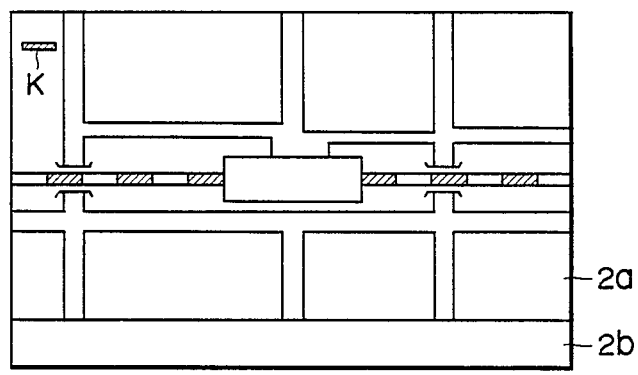
FIGS. 8A to 8C are diagrams explaining how the information displayed by the display section of the hand-held copier changes as information is input by operating the keys provided on the copier.
Figure 8B:
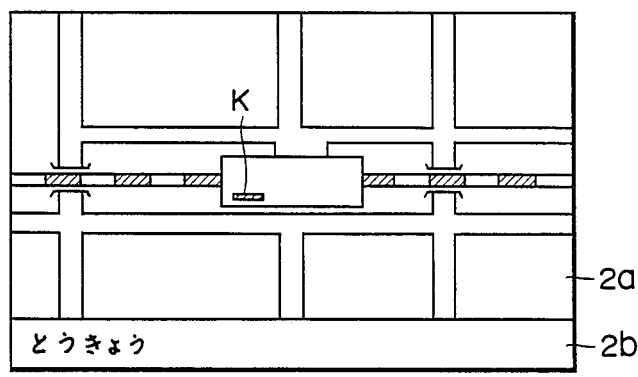

It will now be explained how the hand-held copier is operated to input data, with reference to the flow chart of FIG. 7. To input character data, which will be combined with the image data read from original B, the user moves mode-selecting switch 4 to a "key-input" position. Then, the copier is set in a key-input mode, and cursor K is displayed on upper display section 2a, as is shown in FIG. 8A. The image data, e.g., a map showing a railway station and the area around it, is also displayed on upper display section 2a. The user operates movement keys 4c in key-input section 3a, thereby moving cursor K to the position in section 2a, where he or she wishes to display the character data, as is shown in FIG. 8B. Then, the user pushes character/symbol keys 4a and function keys 4b, thereby inputting character data (Step B1). Assuming that the character data thus input is " とうきょう " ("Tokyo" in kana letters), this data is transferred through control section 51 to key-input storage section 59 and stored therein (Steps B2 and B3). At the same time, the character data is supplied from character generator 66 via control section 51 to display data RAM 60. This data, e.g., " とうきょう ", is thus displayed on lower display section 2b (Step B4). To convert this data, i.e., "Tokyo" in kana letters, to the Chinese characters " 東京 ", the user depresses the key CONV, or the kana/Chinese character conversion key. Then, kana-to-Chinese character conversion section 61 searches the phrases in Chinese characters, then the words in Chinese characters, which seem to correspond to the character data. Next, section 61 searches the Chinese characters which seem to correspond to any combination of the five kana letters " と ", " う ", " き ", " ょ " and " う ", which have been input. The searched phrases, the words in Chinese characters, and the Chinese characters are stored in character storage section 62. Selected one of them are displayed on lower display section 2b. The user pushes the selection key SEL, when desired phrases " 京京 " are displayed. The selected Chinese character data, i.e., " 東京 " ("Tokyo"), is transferred from character storage section 62 to text data memory 63 (Steps B1, B2, B5). Character data, i.e., five kana letters " と ", " う ", " き ", " ょ " and " う ", are erased from display data RAM 60 (Step B6). Then, the Chinese character data, i.e., " 東京 ", is supplied from text data memory 63 through character generator 66 to display data RAM 60, and is stored in RAM 60 (Step B7). As a result this data i.e., " 東京 ", is displayed on lower display section 2b. Kana letter, alphabet and so on which do not need to be converted to Chinese character is transferred from section 59 to character generator 66. Character patterns generated by generator 66 is stored in RAM 60 and displayed by display 2b.

Figure 8C:
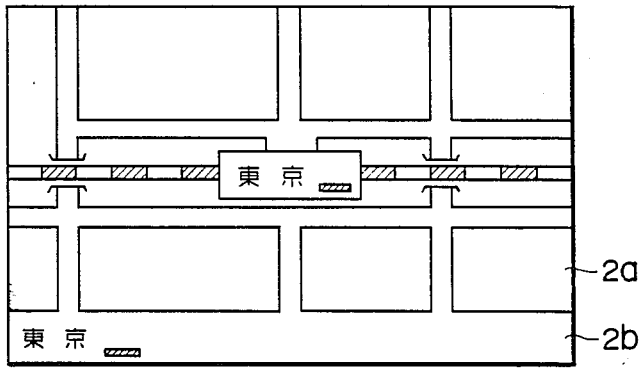

After the character data, which is to be displayed at that position in upper display section 2a which has been designated by the cursor, the user operates the execution key EXE, i.e., one of function keys 4b. Then, the image data displayed in the upper display section 2a and the character data displayed in lower display section 2b are erased from display data RAM 60. Next, the image data stored in image data storage section 57 and the character data stored in text data memory 63 are written into display data RAM 60. As a result, the image data read from original B is displayed in upper display section 2a, and the character data, i.e., " 東京 ", is also displayed in upper display section 2a, at the position designated by the cursor, as is illustrated in FIG. 8C (Steps B1, B2, B8 and B10). That is, the combined data consisting of the image data and the character data is displayed in upper display section 2a.

In order to rewrite the character data while the character data is being displayed in upper display section 2a, along with the image data, the user depresses clear key CLR, which is one of function keys 4b. In this case, control section 51 clears display data RAM 60, and the image data stored in image data storage section 57 is written into display data RAM 60 (Steps B1, B2, B11 and B12). Hence, only the image data is displayed in upper display section 2a. Thereafter, any desired character data can be input by operating key-input section 3a.

It will now be explained how the hand-held copier is operated to print the combined data displayed on upper display section 2a, with reference to the flow charts of FIGS. 9 and 10.

To print the combined data, mode-selecting switch 4 is moved to the "print" position, thereby setting the hand-held copier in the printing mode. Control section 51 transfers the image data from image data storage section 57 to combined data storage section 69 (Step C1). The address in combined data storage section 69, at which the image data will be written, is designated by the address data supplied from control section 51 to address selector 72 of address control section 70. When all image data is written in combined data storage section 69, the character data is transferred from text data memory 63 to combined data storage section 69 (Step C2).

Figures 9, 10:
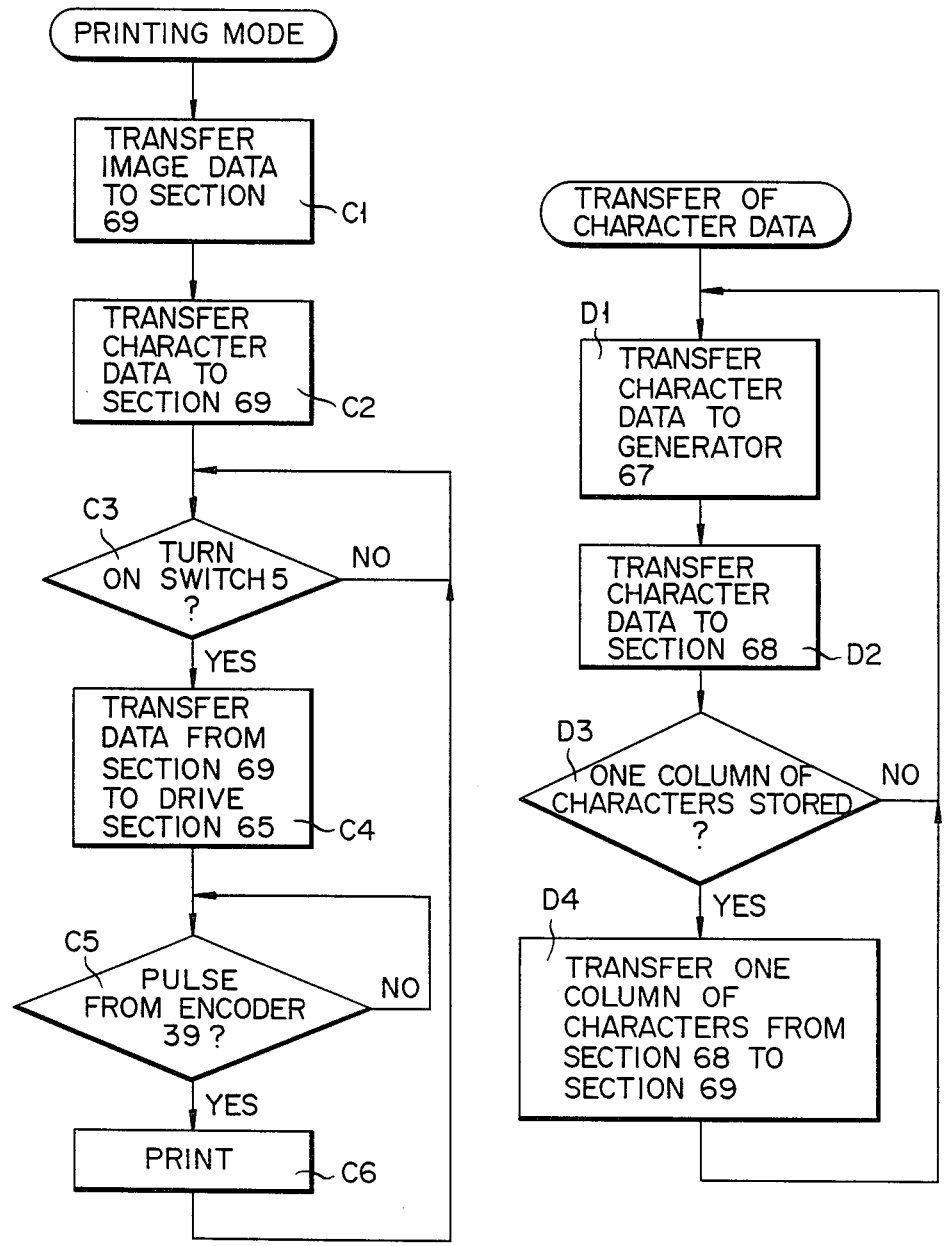
FIG. 9 is a flow chart illustrating how the hand-held copier is operated to print information.
FIG. 10 is a flow chart explaining how the hand-held copier is set in a print mode.

The flow chart of FIG. 10 illustrates how the character data is transferred from text data memory 63 to combined data storage section 69. The character data, which has been read out from text data memory 63 is supplied, character by character, to character generator 67. Character generator 67 converts the character data to character pattern data, which is supplied to character data storage section 68 (Steps D1 and D2). Timing signal-generating section 52 supplies a character-generator sync clock signal "e" to character generator 67 and address-designating section 73 of address control section 70. The address in character data storage section 68, at which the character data will be written, is designated by the address data supplied from address-designating section 73 through address selector 74. The character pattern data supplied to character data storage section 68 is divided into items of one-line data, which correspond to the respective line of text data memory 63 or to the vertical line of display segments of upper display section 2a. The character pattern data is transferred, one line by one line, from character data storage section 68 to combined data storage section 69 (Steps D3 and D4). Timing signal-generating section 52 supplies a sync clock signal to both address counters 71 and 75 of address control section 70. Address counter 75 supplies read address to character data storage section 68 through address selector 74. Address counter 71 supplies write address to combined data storage section 69 through address selector 72. As has been described, image data storage section 57, text data memory 63, and combined data storage section 69 have a memory capacity of storing the largest image which the hand-held copier can read. The combined data is stored in combined data storage section 69, such that the character data is written, column by column, the leftmost column first, and the rightmost column last, as may be understood from FIG. 8C showing the combined data as being displayed in upper display section 2a.

After the combined data, which consists of the image data read from original B and the character data input by operating key-input section 3a, has been stored into combined data storage section 69, the user sweeps the hand-held copier across paper A in the direction of arrow X (FIG. 1), while keeping printing section 3 in contact with paper A and depressing operation switch 5 (Step C3).

As the copier is moved in this way, rubber rollers 25a and 25b rotate, thereby rotating gears 26, 27 and 28. Encoder disk 34, which is fastened to gear 28, therefore rotates. The light emitted from LED 36 is intermittently applied to photosensor 37 through radial slits 35 to disk 34. As a result, photosensor 37 outputs pulses, which form a signal representing the distance the copier has been moved across paper A.

The rotation of gear 28 is transmitted by one-way clutch 33 to ribbon-feeding roller 23, and further to ribbon take-up roller 24 by gears 29 and 30. A rollers 23 and 24 rotate, ink ribbon 22a is fed from roll 22 and guided through slit 43. Ribbon 22a then passes on heating section 21a of thermal head 21. It is further guided through ribbon-guiding window 42, and then guided by ribbon-feeding roller 23. Finally, ribbon 22a is taken up around ribbon take-up roller 24. Ribbon-feeding roller 23 rotates, thereby feeding ribbon 22a at a speed as the hand-held copier is swept across paper A. Hence, no relative movement occurs between ribbon 22a and paper A.

The output pulse signal of photosensor 37 is supplied to control section 51. This signal is also supplied to timing signal-generating section 52. In accordance with this signal, timing signal-generating section 52 supplies a one-line printing command to control section 51, and also supplies print-timing signals PT to thermal head drive section 65. Further, in accordance with the output signal of encoder 39, control section 51 designates the line addresses and digit addresses of combined data storage section 69, in sequence, with the assistance of address control section 70. Then, the combined data is read out from combined data storage section 69, line by line, and supplied to thermal head drive section 65.

Meanwhile, control section 51 calculates the time for supplying power to thermal head 21, in response to each one-line printing command from section 52, on the basis of the number of black points in the one-line combined data, the temperature of thermal head 21, the voltage detected by a power-supply voltage detector (not shown), and the print density selected by rotating density control dial 7. Then, control section 51 transfers the combined data of the line, which has been read out of combined data storage section 69, to thermal head drive section 65 (Step C4). Drive section 65 drives thermal head 21 in accordance with the control data supplied from control section 51 and print-timing signals PT supplied from timing signal-generating section 52 (Steps C5 and C6). Thermal head 21 therefore prints the combined data on paper A by using ink ribbon 22a. As the hand-held copier is moved across paper A during the printing operation, the unused portion of ribbon 22a is fed from roll 22, and the used portion thereof is taken up around ribbon take-up roller 24. In this manner, the combined data stored in combined data storage section 69 is printed on paper A, line after another (Steps C3 to C6).

As has been explained, it is possible with the hand-held copier described above, not only to read an image from original B merely by sweeping the copier across original B, but also to input character data by operating key-input section 3a and then print the image on paper A, together with the character data only by sweeping the copier across paper A.

Figure 11:
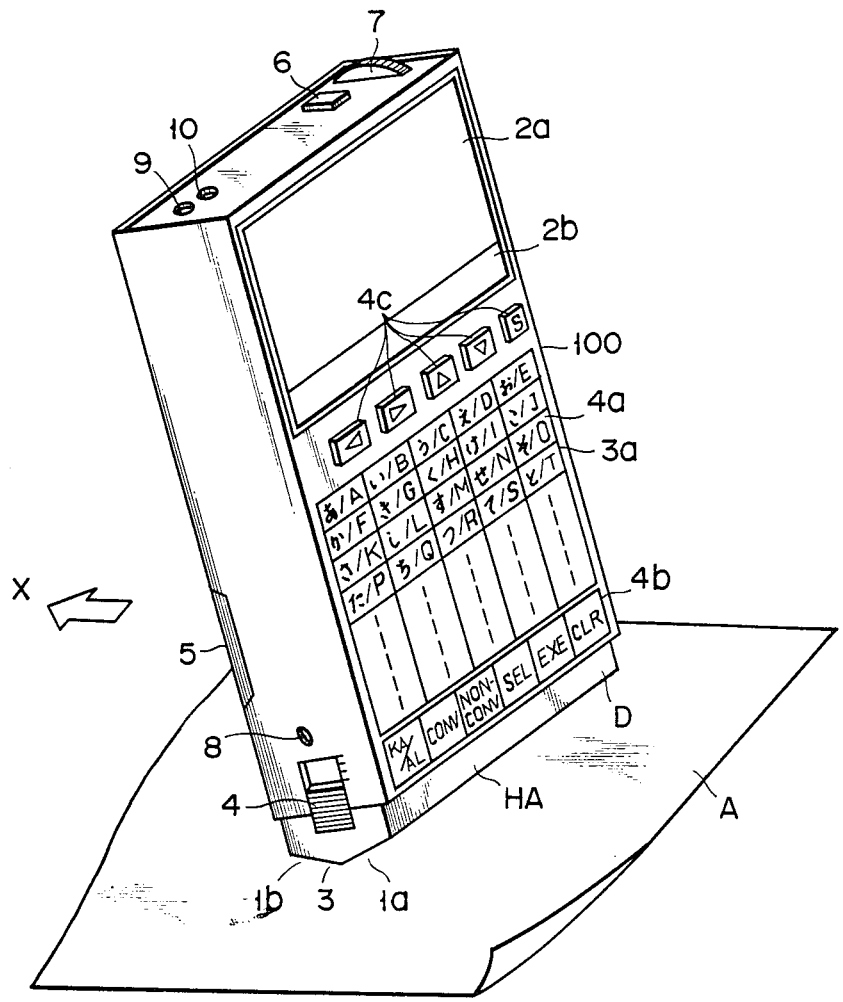
FIG. 11 is a perspective view of a hand-held copier according to a second embodiment of the invention.

A second embodiment of the present invention will now be described, with reference to FIG. 11 which is a perspective view of a hand-held copier according to the second embodiment. In FIG. 11, the same numerals are used to designate the components of this copier, which are identical to those of the hand-held copier of the first embodiment (FIG. 1).

Hand-held copier 100 shown in FIG. 11 is different from the copier of the first embodiment (FIG. 1) in that cursor keys 4a further has set key $\boxed{s}$.

When the key input mode is selected, movement keys 4c is operated to move cursor K as described in first embodiment. When the reading mode is selected, movement keys 4c is operated to move two vertical lines and two horizontal lines on upper display section 2a, to desired positions in order to designate a desired portion of the image data read from original B, so that only this desired portion of the image data is printed on paper A.

Figure 12B:
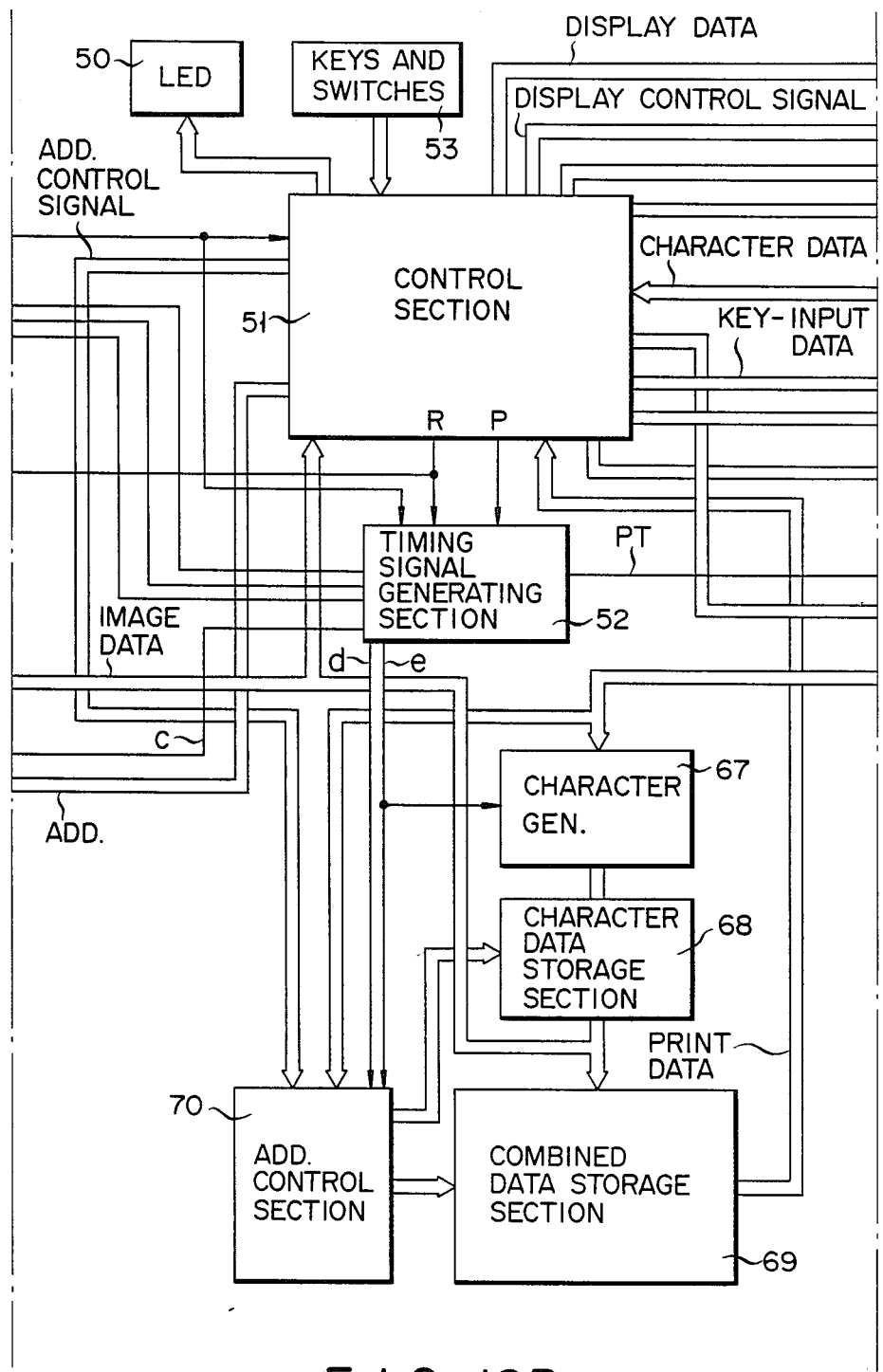
Figure 12C:
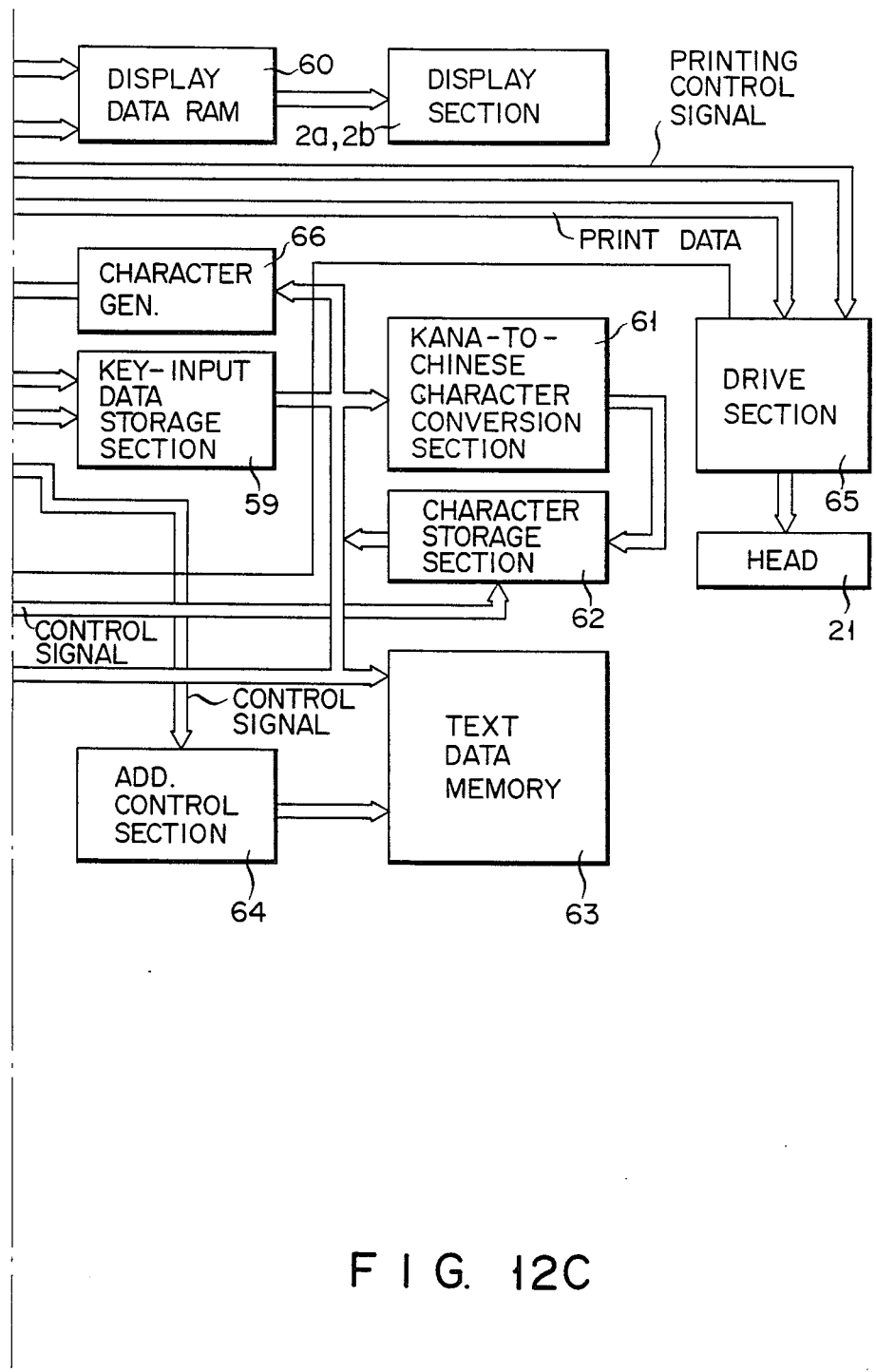

FIGS. 12A to 12C are block diagrams showing the electronic circuit provided with hand-held copier 100. This electronic circuit is identical to the circuit (FIGS. 4A to 4C) of the first embodiment, except that image data storage/process section 100A is used in place of image data storage section 57 and address control section 58.

Image data storage/process section 100A is connected by signal line with control section 51, timing signal-generating section 52 and serial-to-parallel conversion section 56, as is illustrated in detail in FIG. 13.

As is shown in FIG. 13, the output data of binary encoding section 55 is supplied to serial-to-parallel conversion section 56 and converted into 8-bit parallel data. The 8-bit data are input via data selector 101 to image data memory 102. Data selector 101 is coupled to control section 51 by a line. Control section 51 supplies a select signal "i" to data selector 101. In accordance with this signal "i", data selector 101 selects control section 51 or serial-to-parallel conversion section 56. Any write address (both a line address and a digit address) of image data memory 102 is designated by address counter 103. More precisely, address counter 103 supplies address data to address selector 104, and address selector 104 inputs the address data to image data memory 102, thereby to designate an address of memory 102. The address data supplied from address counter 103 to address selector 104 has been designated by address data supplied from control section 51 to selector 104. A select signal "j" is supplied from control section 51 to address selector 104. In accordance with select signal "j", selector 104 selects address counter 103 when hand-held copier 100 is set in the reading mode, and selects control section 51 when copier 100 is set in either the printing mode or the key-input mode. In whichever mode the hand-held copier is set, address selector 104 designates a desired address of image data memory 102.

The image data read from original B is stored in image data memory 102. This image data is input via control section 51 to display data RAM 60. It is read from RAM 60 and displayed by upper display section 2a. The lines, which are displayed on upper display section 2a, are moved by operating the keys 4c (FIG. 11), thereby to designate that portion of the image being displayed on section 2a which the user wishes to print on paper A. More specifically, the positions of these lines are changed by operating switches 53 (FIGS. 12A to 12C) and under the control of control section 51, data-editing section 105 and line-display control section 106.

Data-editing section 105 is connected to control section 51 by an address bus, to which address selector 104 is coupled. Section 106 compares the address defined by the signals input by operating the movement keys 4c, with every address of image data memory 102. When the compared addresses are identical, address selector 104 selects the identical address of image data memory 102. The image data stored at the selected address of image data memory 102 is transferred to edition data memory 107. Read/write signal R/W is supplied to image data memory 102 through read/write control section 108 from either control section 51 or data-editing section 05.

After the image has been read from original B, or after the desired portion of the image thus read out has been designated and edited, the user can set the hand-held copier in the key-input mode. If this is the case, the data stored in image data memory 102 or edition data memory 107 is transferred to display data RAM 60. If the user sets the copier in the print mode after the image has been read from original B or after the desired portion of the image has been designated, the data stored in image data memory 102 or edition data memory 107 is transferred to combined data storage section 69.

Figure 14A:
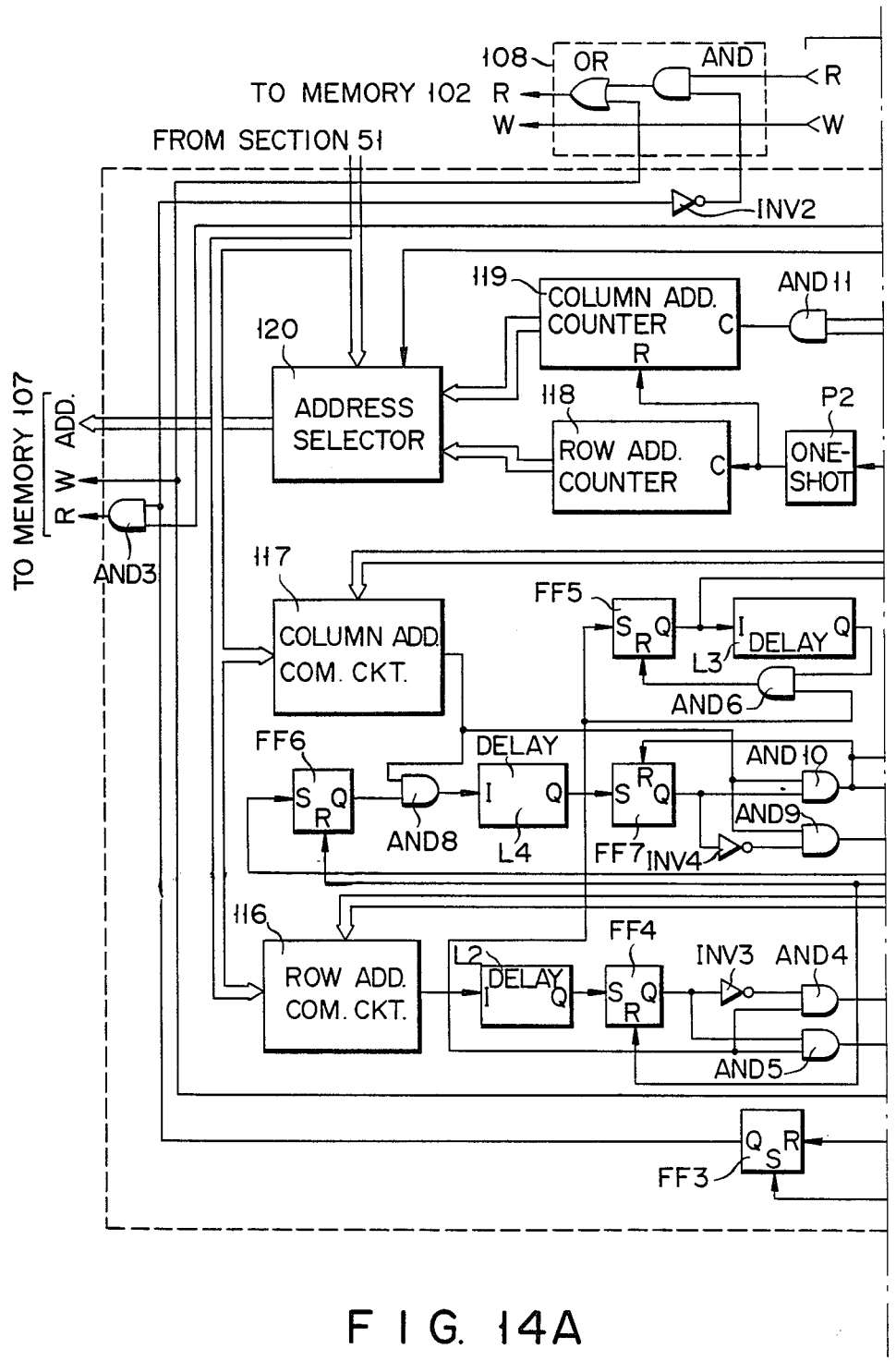
FIGS. 14A and 14B are block diagrams showing, in detail, the data-editing section shown in FIG. 13.
Figure 14B:
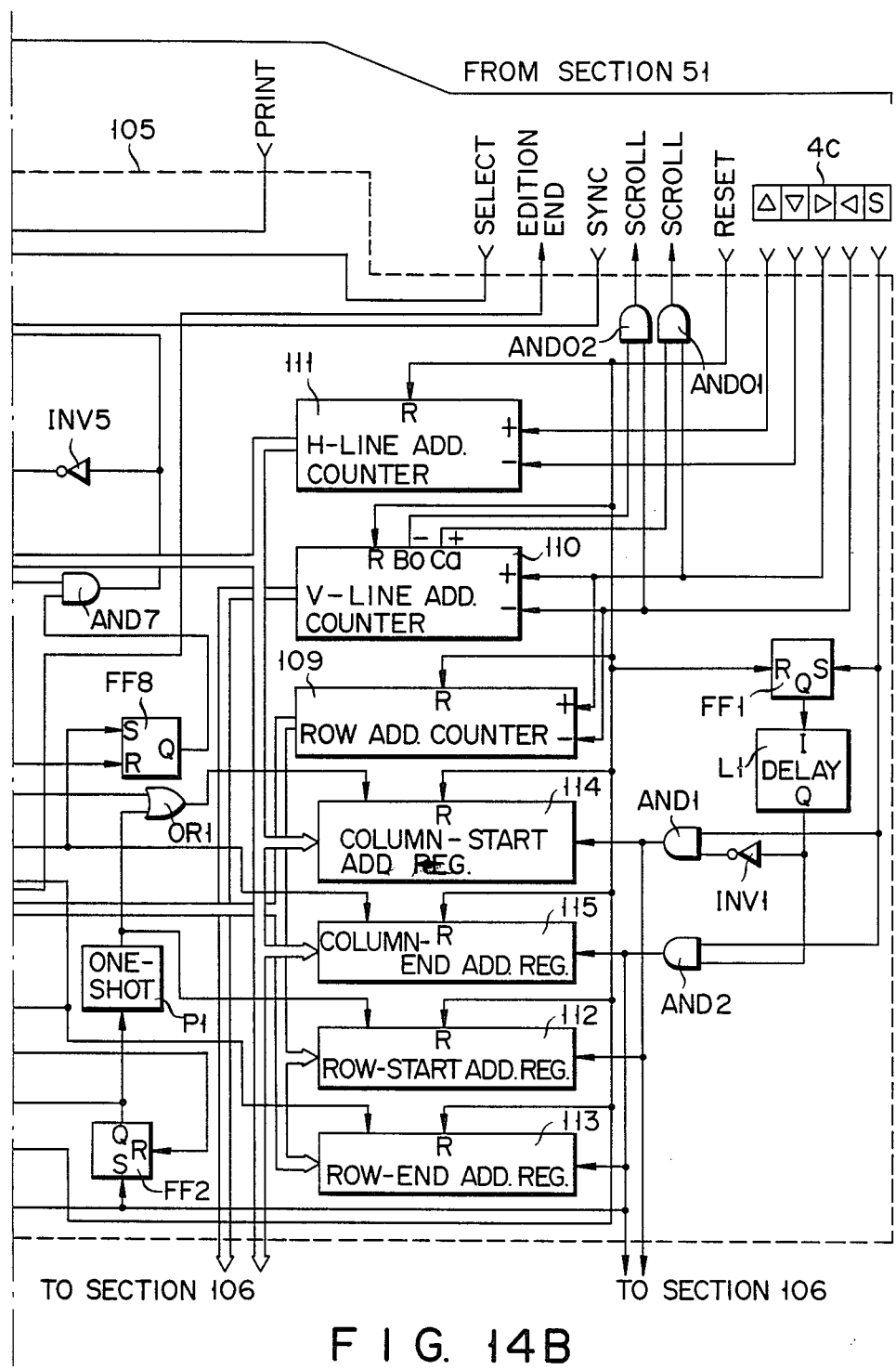

Data-editing section 105 will now be described in detail, with reference to FIGS. 14A and 14B. As is shown in this figure, the signals input to control section 51 by operating the keys 4c, thereby to designate that portion of the image which the user wishes to print, are supplied to row-address counter 109, vertical-line address counter 110, and horizontal-line address counter 111. More precisely, the signals for moving either vertical line to the left or the right on upper display section 2a are input to address counters 109 and 110, whereas the signals for moving either horizontal line up or down display section 2a are input to address counter 111.

Row-address counter 109 counts the relative positions of vertical lines in the image to be printed. The row-address counted by the counter 109 at the first time is stored in row-start address register 112. The row-address counted by the counter 109 at the second time is stored in row-end address register 113.

Vertical-line address counter 110 counts the positions vertical lines in display 2a, and produces a carry signal Ca and a borrow signal Bo. Both the carry signal and the borrow signal are supplied to control section 51 and used as screen-scrolling commands. The address data output from vertical-line address counter 110 is supplied to line-display control section 106 and used to control the position of the vertical line.

Horizontal-line address counter 111 counts the positions of either horizontal lines in display 2a. The column-address of the vertical line counted by counter 111 at the first time is stored in column-start address register 114. The column-address of the vertical line counted by counter 111 at the second time is stored in column-end address register 115. The column-address data output from horizontal-line address counter 111 is supplied to line-display control section 106 and used to control the position of the horizontal line.

The row-address data latched in row-start address register 112, and the row-address data latched in row-end address register 113 are sequentially transferred to row-address comparator circuit 116 and compared with the read address data supplied from control section 51 and designating the address of image data memory 102, from which the data will be read out. The column-address data latched in column-start address register 114, and the column-address data latched in column-end address register 115 are sequentially transferred to column-address comparator circuit 117 and compared with the read address data output from control section 51 and designating the address of image data memory 102, from which the data will be read out.

When the row-start address coincides with the read address, row-address counter 118 has its count valued incremented by one. Similarly, when the column-start address coincides with the read address, the count value of column-address counter 119 is incremented by one in synchronism with an address sync signal supplied from control section 51. When the column-end address coincides with the read address, column-address counter 119 stops counting up the count value and row-address counter 118 has its count value incremented by one. The count data of row-address counter 118, and the count data of column-address counter 119 are supplied to edition data memory 107 through address selector 120, thus designating the address of edition data memory 107, at which the data read from image data memory 102 is written. The column-start address and column-end address are repeatedly compared with the read addresses by column-address comparator circuit 117. Then, when the row-end address coincides with the read address, read/write control section 108 stops supplying read signals R to image data memory 102, and also stops supplying write signals W to edition data memory 107.

The operation of hand-held copier 100 will be explained. Copier 100 reads image data from original B in the same way as the hand-held copier according to the first embodiment. The image data is input to image data memory 102 through data selector 101, at the addresses which have been designated by address counter 103 which operates in response to the pulses output from encoder 39.

Figure 15B:
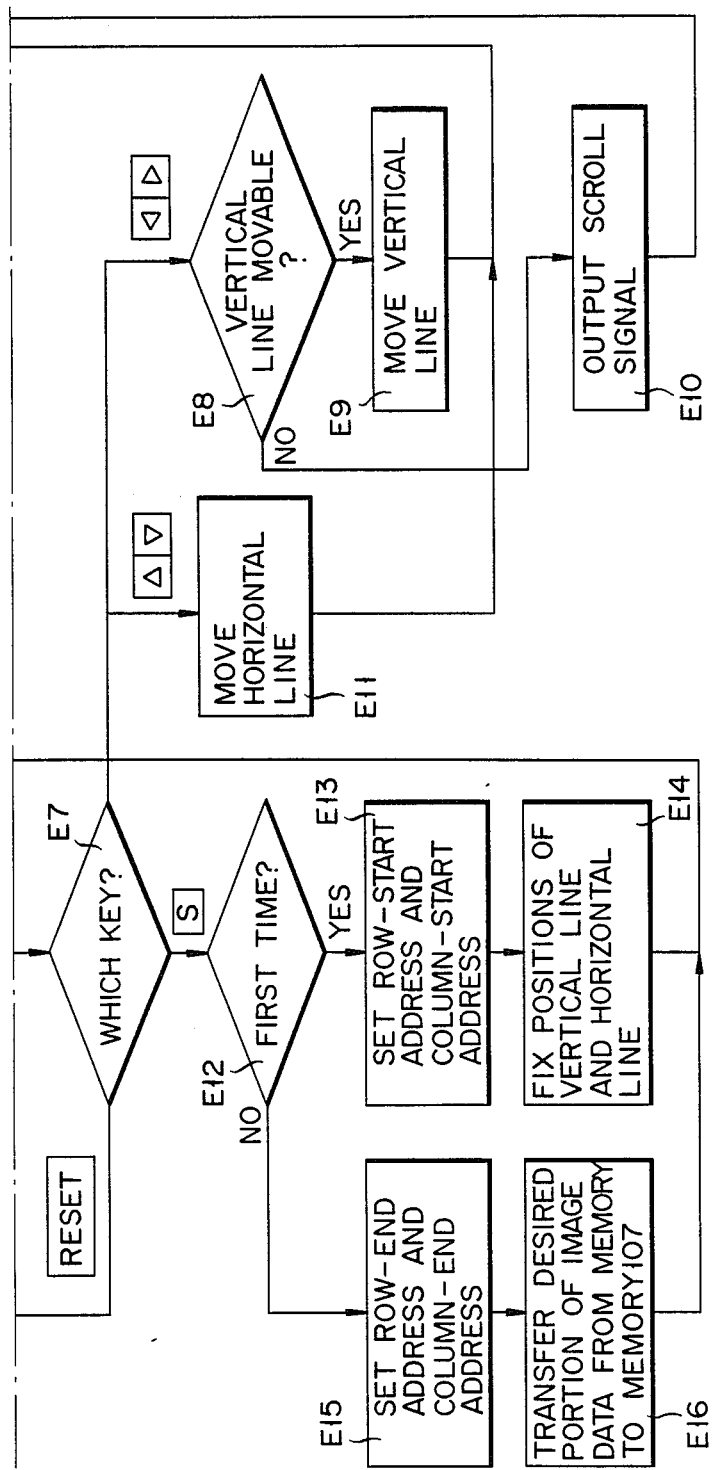

It will now be explained how hand-held copier 100 is operated in order to designate a portion of the image data written in image data memory 102, which the use wished to print on paper A, with reference to the flow chart of FIGS. 15A and 15B.

First, the user sweeps hand-held copier 100 across original B in one direction, thereby reading the image from original B (Step E1). It is determined whether or not the image has been read (Step E2). If Yes, control section 51 supplies a reset signal to data-editing section 105, thus initializing section 105 (Step E3). As a result, counters 109 to 111, resistors 112 to 115 and flip-flops FF1 and FF3 of data-editing section 105, are reset. Then, control section 51 supplies read signal R to image data memory 102 through read/write control section 108, and write command W to display data RAM 60, whereby the image data is transferred from image data memory 102 to display data RAM 60 (Step E4).

Control section 51 produces a display command, and the image data is displayed on upper display section 2a (Step E5). Thereafter, the user operates the ← key or the → key in movement keys 4c, thereby to move first vertical line V1 (Steps E6 and E7). Then, it is determined whether or not line V1 can be moved on upper display section 2a (Step E8). This decision is made in accordance with the output signals of vertical-line address counter 110. More specifically, when address counter 110 outputs neither carry signal Ca nor borrow signal Bo, it is determined that line V1 can be moved. In this case, line-display control section 106 operates in accordance with the address data output from address counter 110, thereby moving first vertical line V1 to the position determined by the number of times the ← or → key has been depressed (Step E9).

If it is determined in Step E8 that line V1 cannot be moved, that is, if line V1 moves to the left of the left side of display section 2a or to the right of the right side of section 2a, vertical-line address counter 110 generates a borrow signal Bo or a carry signal Ca. Assuming that address counter 110 outputs carry signal Ca, this signal is supplied as a right-scroll signal to control section 51 through AND gate AND01. Assuming that counter 110 outputs borrow signal Bo, signal Bo is supplied as a left-scroll signal to control section 51 through AND gate AND02 (Step E10). Then, the operation returns to Step E4, in which control section 51 transfers the image data from image data memory 102 to display data RAM 60, said image data represents a right portion or a left portion of the image read from original. Hence, in Step E5, this image data is displayed on display section 2a.

After first vertical line V1 has been moved to the desired position in display an image defined by the image data (Steps E6 to E9), the user pushes ⬇ key or the ⬆ key, whereby horizontal-line address counter 111 functions, thus moving first horizontal line H1 upward or downward in display section 2a, to a desired position (Step E5).

Figure 17:
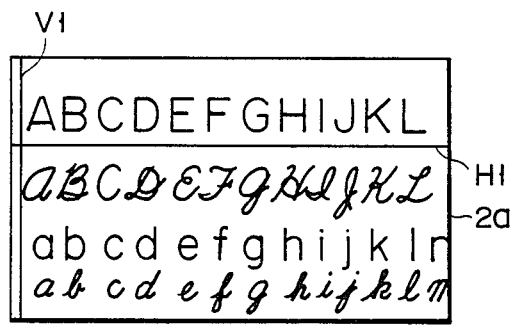
FIGS. 17 and 18 are diagrams showing parts of the data (FIG. 16), which are being displayed.

When first vertical line V1 moved to the desired position defines the left side of a print area which the user wishes to print, and first horizontal line H1 moved to the desired position defines the upper side of this print area as shown in FIG. 17, the user pushes set key S of key-input section 3c. When set key S is depressed, AND gate AND1 (FIGS. 14A and 14B) is turned on. Then, it is determined in Step E7 that the input signal has been produced by depressing set key S. Further, it is determined in Step E12 whether or not set key S has been pushed for the first time. Since key S has been pushed for the first time, the operation goes to Step E13. In Step E13, the count value of row-address counter 109, which represents the position of vertical line V1 is transferred to row-start address register 112, and the count value of horizontal-line address counter 111, which represents the position of horizontal line H1, is transferred to column-start address register 114. Then, in Step E14, line-display control section 106 fixes the positions of vertical line V1 and horizontal line H1 in the image defined by the image data.

Thereafter, Steps E5 through E11 are repeated, thereby moving second vertical line V2 to the left or the right to a desired position in the image thus defining the right side of the print area of the image which the user wishes to print, and moving second horizontal line H2 to upward or downward to a desired position in display section 2a, thus defining the lower side of the print area.

Figure 16:
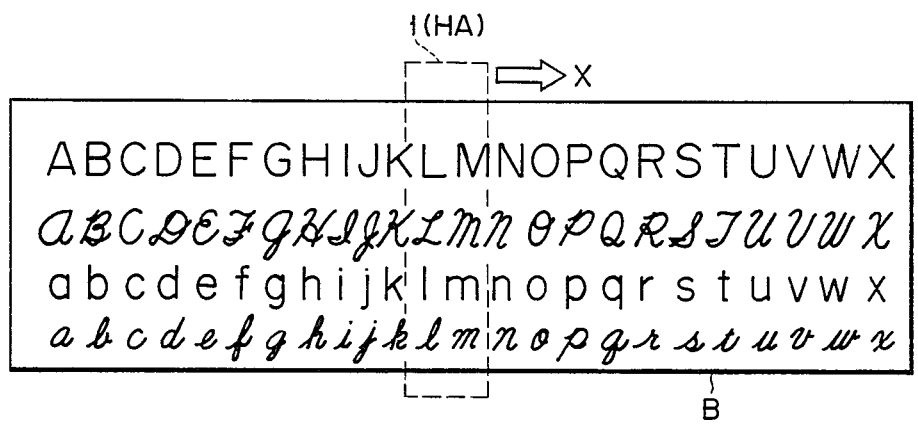
FIG. 16 is a diagram showing data which the hand-held copier can read.
Figure 18:
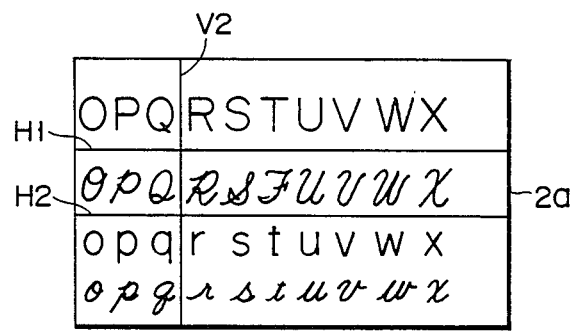

Let us assume that the image data read from original B is four lines characters, as is illustrated in FIG. 16. Let us also assume that the user wishes to print only letters A to Q of the second line, which are of English handwriting. In this case, first vertical line V and first horizontal line H1 are positioned in display section 2a as is shown in FIG. 17, and second vertical line V2 and second horizontal line H2 are positioned in section 2a as is shown in FIG. 18. As may be understood from FIGS. 17 and 18, the image has been scrolled to the right, from the condition of FIG. 17 to the condition of FIG. 18, so that second vertical line V2 may be moved to the designed position shown in FIG. 18.

When set key S is pushed for the second time, after second vertical line V2 and second horizontal line H2 have been moved to the desired positions, it is determined in Step E12 that key S has been depressed not for the first time. This decision is made since AND gate AND2 (FIGS. 14A and 14B) is turned on. Then, in Step E15, the count value of row-address counter 109, which represents the position of vertical line V2, is latched in row-end address register 113, and the count value of horizontal-line address counter 111, which represents the position of horizontal line H2, is latched in column-end address register 115.

When the positions of two vertical lines V1 and V2 and two horizontal lines H1 and H2 are set, thus designating the desired portion of the image data stored in image data memory 102, the print area of this image data is read from image data memory 102 and written into edition data memory 107 (Step E16).

Figure 19:
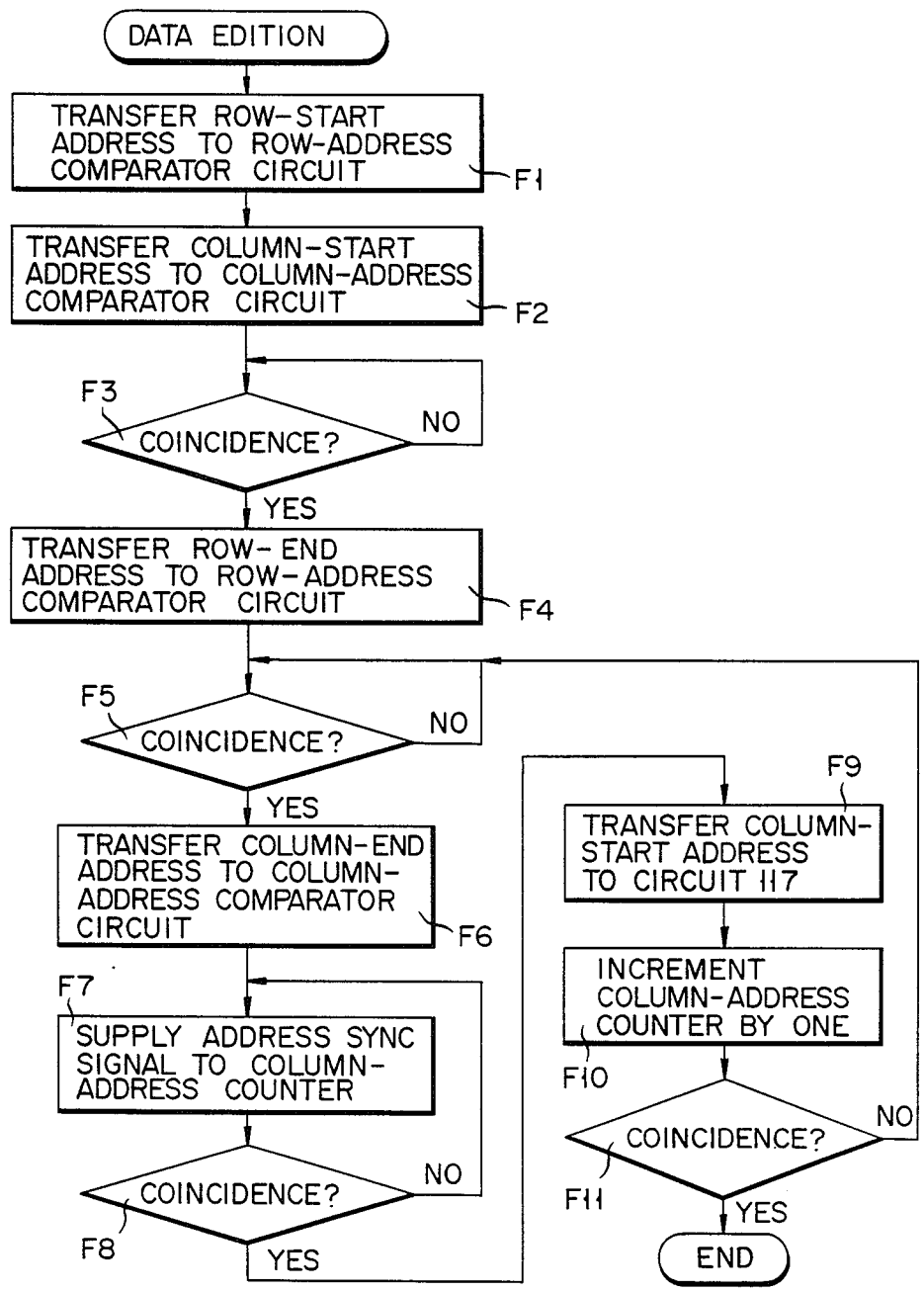
FIG. 19 is a flow chart illustrating how the hand-held copier is operated to edit information.

It will be described now the print area of the image data is written into edition data memory 107, with reference to the flow chart of FIG. 19. In Step F1, flip-flops FF2 and FF3 are set the moment set key S is pushed for the second time. Flip-flop 2 supplies a Q output to one-shot circuit P1, which in turn supplies an output signal to row-start address register 112. As a result, the row-start address is transferred to row-address comparator circuit 116. In Step F2, the output signal of one-shot circuit P1 is supplied via OR gate OR1 to column-start address register 114, whereby the column-start address is transferred from register 114 to column-address comparator circuit 117.

At this time, read signal R is supplied to image data memory 102 through the OR gate of read/write control section 108, and write signal W is supplied to edition data memory 107. Control circuit 51 sequentially supplies read addresses of image data memory 102 to both row-address comparator circuit 116 and column-address comparator circuit 117 (Step F3). When the rowstart address coincides with one of the read addresses supplied from control section 51, AND gate AND4 is turned on, whereby the row-end address is transferred from row-end address register 113 to row-address comparator circuit 116 (Step F4). Hence, the read address of image data memory 102 reaches the row-start address defined by first vertical line V1. Then, flip-flops FF5 and FF7 are set.

In Step F5, column-address comparator circuit 117 compares the column-start address with the read addresses of image data memory 102. When the column-start address coincides with any read address of image data memory 102, AND gate AND9 is turned on, whereby the column-end address is transferred from column-end address register 115 to column-address comparator circuit 117 (Step F6). This read address of memory 102 corresponds to the intersection of first vertical line V1 and first horizontal line H1, both shown in FIG. 17. Flip-flop FF8 is set, and AND gates AND7 and AND11 are turned on. As a result, control section 51 supplies an address sync signal to column-address counter 119 (Step F7). Then, counter 119 starts counting write column-addresses of edition data memory 107. These write column-addresses have been supplied through address selector 120. The image data read from image data memory 102 is written into edition data memory 107 until the column-end address coincides with any read address of image data memory 102 (Step F8). In other words, the piece of image data, which corresponds to the first-row of the desired portion of the image data is written into edition data memory 107.

When it is determined in Step F8 that the column-end address coincides with any read address of memory 102, flip-flop FF8 is reset by the output signal of AND gate AND10. Column-address counter 119 stops performing its function, and the column-start address is again transferred from column-start address register 114 to column-address comparator circuit 117 (Step F9). Since flip-flop FF8 has been reset, AND gate AND7 is turned off. As a result, one-shot circuit P2 is driven by the output signal of inverter INV5, and produces an output signal, which is supplied to row-address counter 118. The count value of this counter 118 is thus incremented by one (Step F10). Hence, the write addresses of edition data memory 107 is set to the second row, and the first column. Then, Steps F5 to F10 are repeated until it is determined in Step F11 that the row-end address coincides with any read address of image data memory 102. This decision is made by row-address comparator circuit 116. As the column-start address repeatedly coincides with the read circuit of image data memory 102 in Step F5, and as the column-end address repeatedly coincides with the read address of memory 102 in Step F8, column-address counter 119 counts write column-addresses of edition data memory 107, and row-address counter 118 counts the write row-addresses of memory 107. As a result, the second row, the third row, and so on, of the desired portion of the image data are read out from image data memory 102 and written into edition data memory 107. Thereafter, in Step F11, it is determined whether or not the row-end address coincides with read address of image data memory 102. When the row-end address coincides with read address of memory 102, flip-flop FF2 is reset, whereby the supply of read signals R to memory 102 is stopped, and the supply of write signals W to memory 107 is also stopped. Then, a signal showing that the edition has been completed is supplied to control section 51. At this time, the read address of image data memory 102 is the row-end address which corresponds to second vertical line V2 (FIG. 18). Hence, a portion of the image, which the user wishes to print and which corresponds to the rectangular defined by vertical lines V1 and V2 and horizontal lines H1 and H2, has been transferred from image data memory 102 to edition data memory 107.

Figure 20:
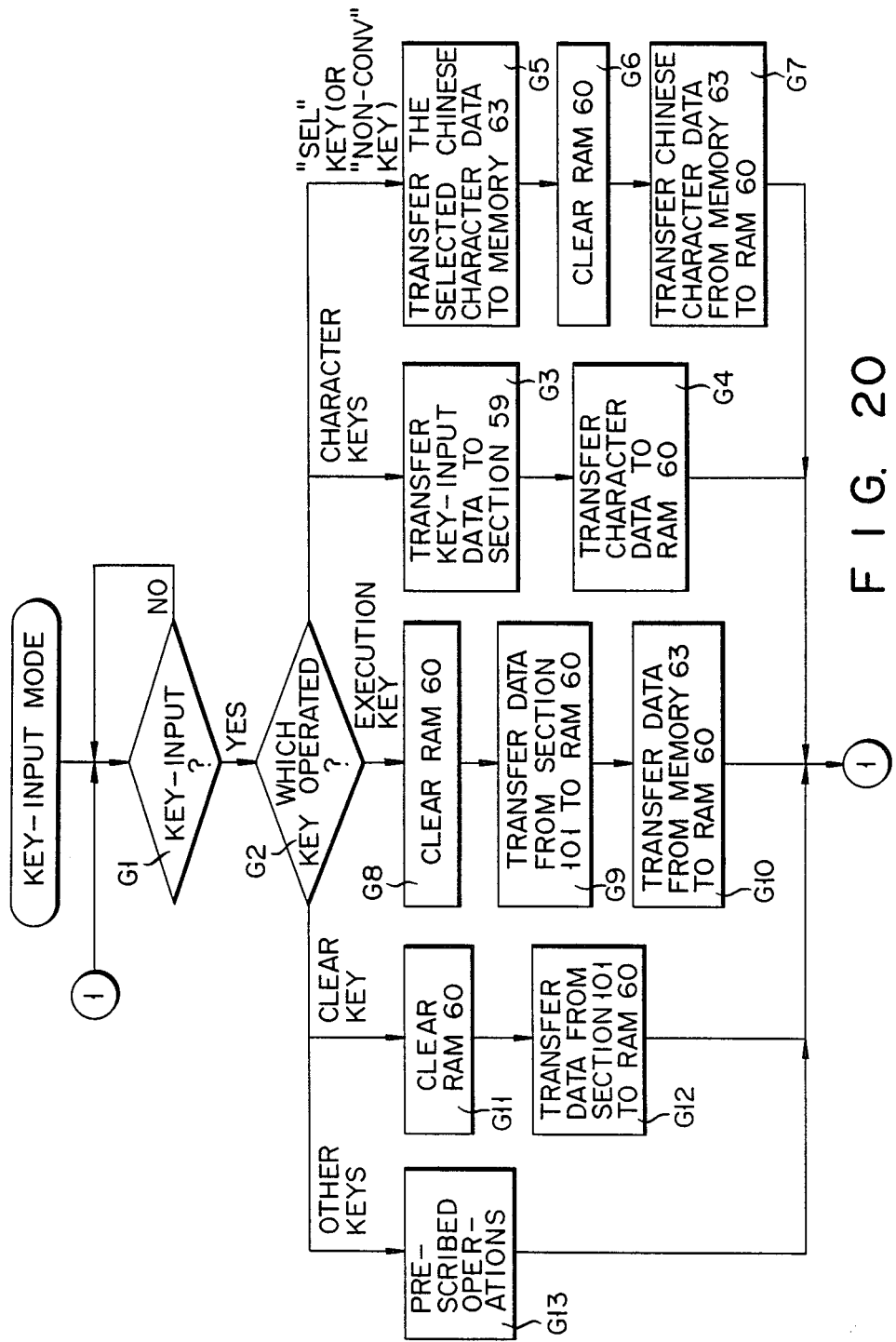
FIG. 20 is also a flow chart explaining how the hand-held copier is operated to input data.
Figure 21:
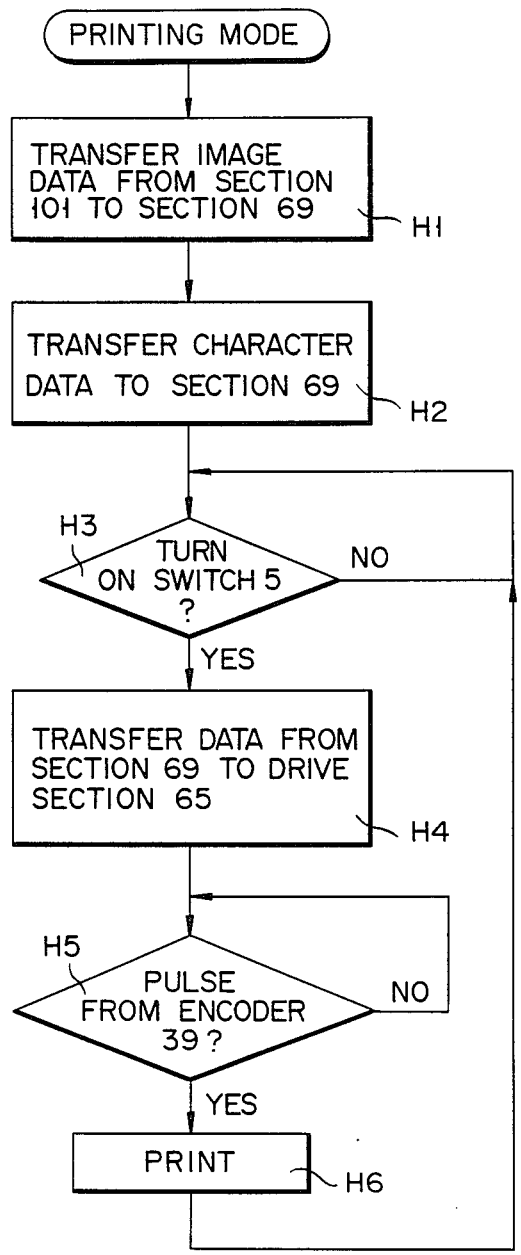
FIG. 21 is a flow chart explaining how the hand-held copier is operated to print information.

Then, the user can operate mode-selecting switch 4, in order to set hand-held copier 100 in the key-input mode or the printing mode. Copier 100 operates in the key-input mode as is shown in the flow chart of FIG. 20, and in the print mode as is illustrated in the flow chart of FIG. 21, in almost the same manner as the hand-held copier of the first embodiment. In operates in a different way, only in the following respects.

Figure 22:
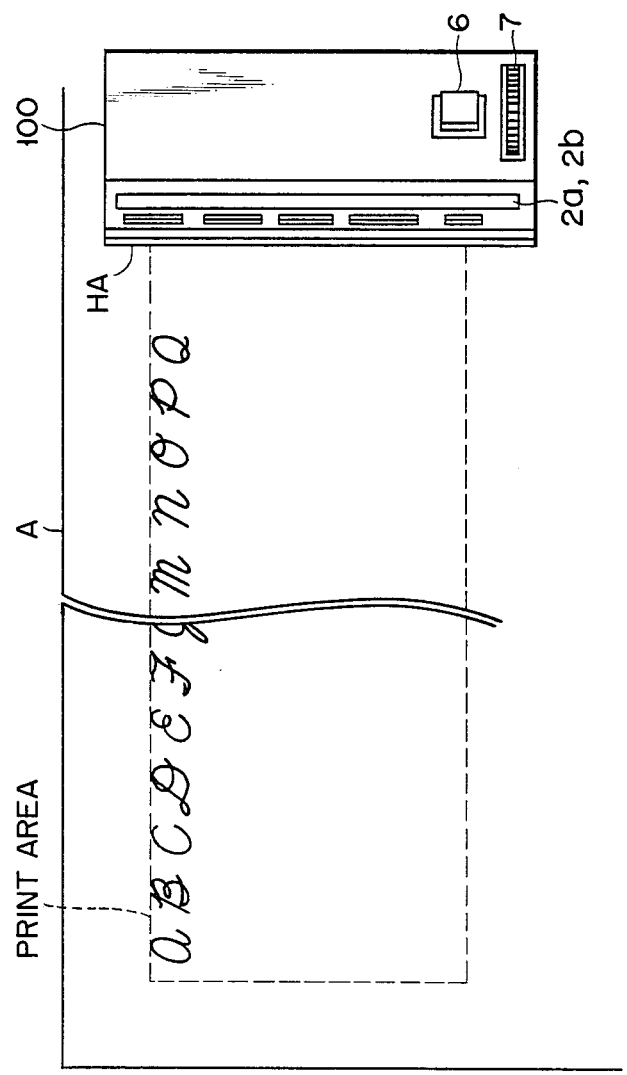
FIG. 22 is a diagram illustrating how the hand-held copier prints information.

In the key-input mode (FIG. 20), the data is transferred from image data storage/process section 101 to display data memory 60 in Steps G9 and G12, in different manners in accordance with whether nor not a desired portion of the image data, which the user wishes to print, has been designated. Similarly, in the printing mode (FIG. 21), the data is transferred from section 101 to RAM 60 in Step H1, in different ways in accordance with whether or not such a desired portion of the image data has been designated. More specifically, when the print area of the image data has been designated, flip-flop FF3 has been set by depressing set key S for the second time, as is shown in FIGS. 14A and 14B. The output signal Q of flip-flop FF3 is supplied via AND gate AND3 and inverter INV2 to the AND gate of read/write control section 108. Read signal R which has been output from control section 51, is not input to image data memory 102, but is input to edition data memory 107. The image data is, therefore, read from edition data memory 107 in response to address supplied from control section 51 through address selector 120. Hence, when copier 100 is set in the key-input mode, this image data is transferred to display data RAM 60. When copier 100 is set in the printing mode, the data is transferred to combined data storage section 69. Hence, if the print area of the image is designated and copier 100 is set in the printing mode without inputting any character data, such an image as is shown in FIG. 22 will be printed.

Let us assume that print area of the image, which the user wishes to print, is not designated during the image-reading operation. In this case, flip-flop FF3 is not set, and read signal R supplied from control section 51 is input to image data memory 102. As a result, the image data is supplied from memory 102 to either display data RAM 60 or combined data storage section 69.

As has been described, hand-held copier 100, i.e., the second embodiment of the present invention, can print the whole image read from an original, or only a desired portion of this image, in either case, singly or in combination with the character data input by operating the key-input section of the copier.

A third embodiment of the invention will be described, with reference to FIG. 23 which is a perspective view of a hand-held copier. The hand-held copier has housing 200, which is 70 mm wide, 30 mm deep, and 260 mm long, as the housing of the first embodiment (FIG. 1). The copier can read and print an image having a maximum width of 40 mm, and can store data representing an image having a maximum width of 40 mm and a maximum length of 200 mm. It can read an image in the resolution of 8 dots/mm at most, and can print the image in the density of 8 dots/mm at most.

Key-input section 200a and display section 200b are provided on the front surface of housing 200. Keyinput section 200a has numeral keys, alphabet keys, clear key C, execution key EXE, etc. When clear key C is pushed, the character data input by operating the numeral and alphabet keys is cleared. When execution key EXE is depressed, the character data input by operating the numeral keys and the alphabet keys are written into a 160-bit shift register which can store twenty 8-bit character codes. Display section 200b is a liquid crystal display capable of displaying 20 characters at most.

To read data from an original by means of this hand-held copier, a user moves switch 4 to a "read" position. Then, power is supplied to the copier, and LED 8, i.e., a power-supply pilot lamp, starts emitting light. The user sweeps the copier across the original, while depressing operation switches 5a and 5b and keeping reading section 2 in contact with the original. When the hand-held copier is moved at a speed higher than a predetermined value, LED 10, i.e., an alarm lamp, emits light, thereby informing the user that the copier is being moved too fast.

In order to print the image read from the original on a sheet of paper, along with a message such as the date of reading the image data or a caption for this image data, the user operates key-input section 200a before reading the image, thereby to input the character data, i.e., the message.

To print the image together with the character data on a sheet A of paper, the user moves switch 4 to a "print" position, thus setting the hand-held copier in a printing mode. Then, the user sweeps the copier across paper A, while depressing both operation switches 5a and 5b and keeping housing 200 in contact with paper A, in the direction of arrow X as is shown in FIG. 1. As a result, both the image and the character data are printed on paper A, such that the character data is printed in the top portion of the image.

Figure 23:
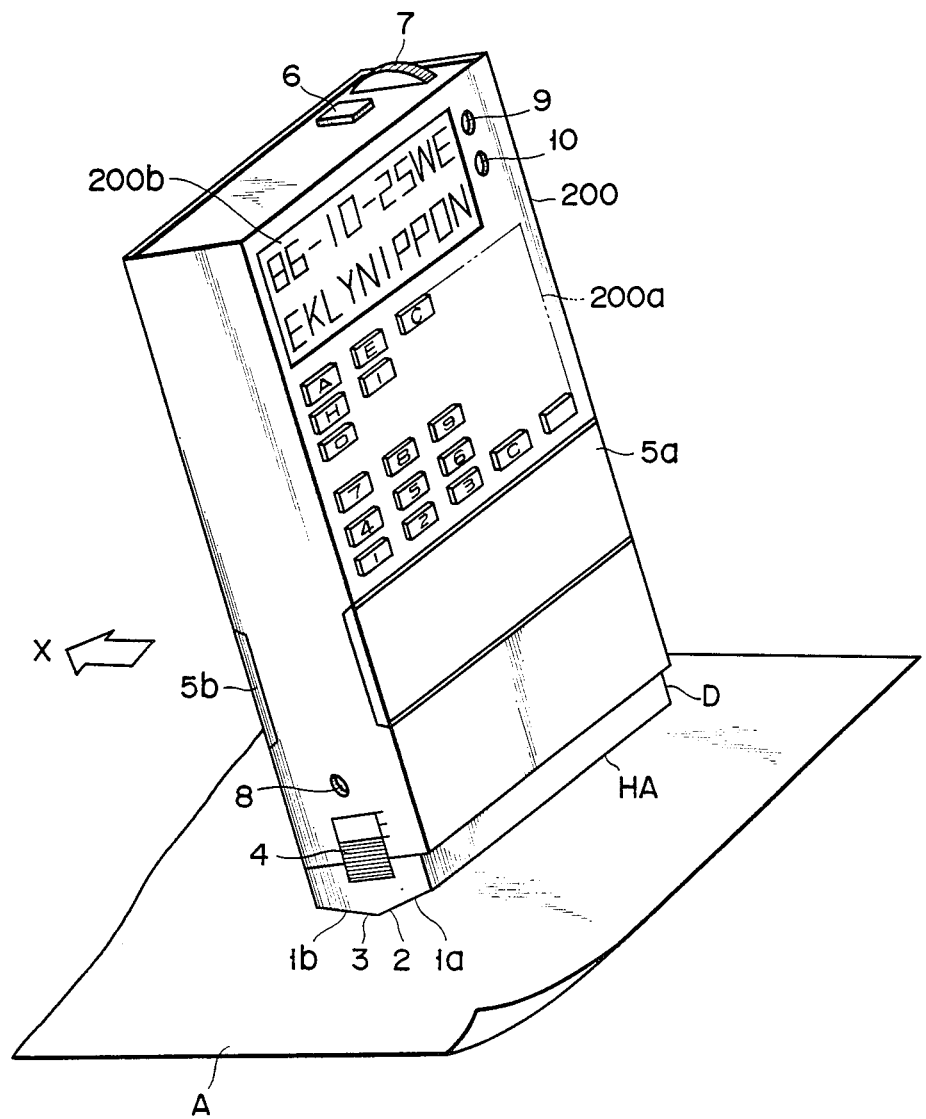
FIG. 23 is a perspective view showing a hand-held copier according to a third embodiment of the present invention.

The hand-held copier shown in FIG. 23 has reading section 2 and printing section 3. These sections are identical, in structure, to those of the first embodiment (FIG. 1), and are not illustrated and not described in detail.

Figure 24B:
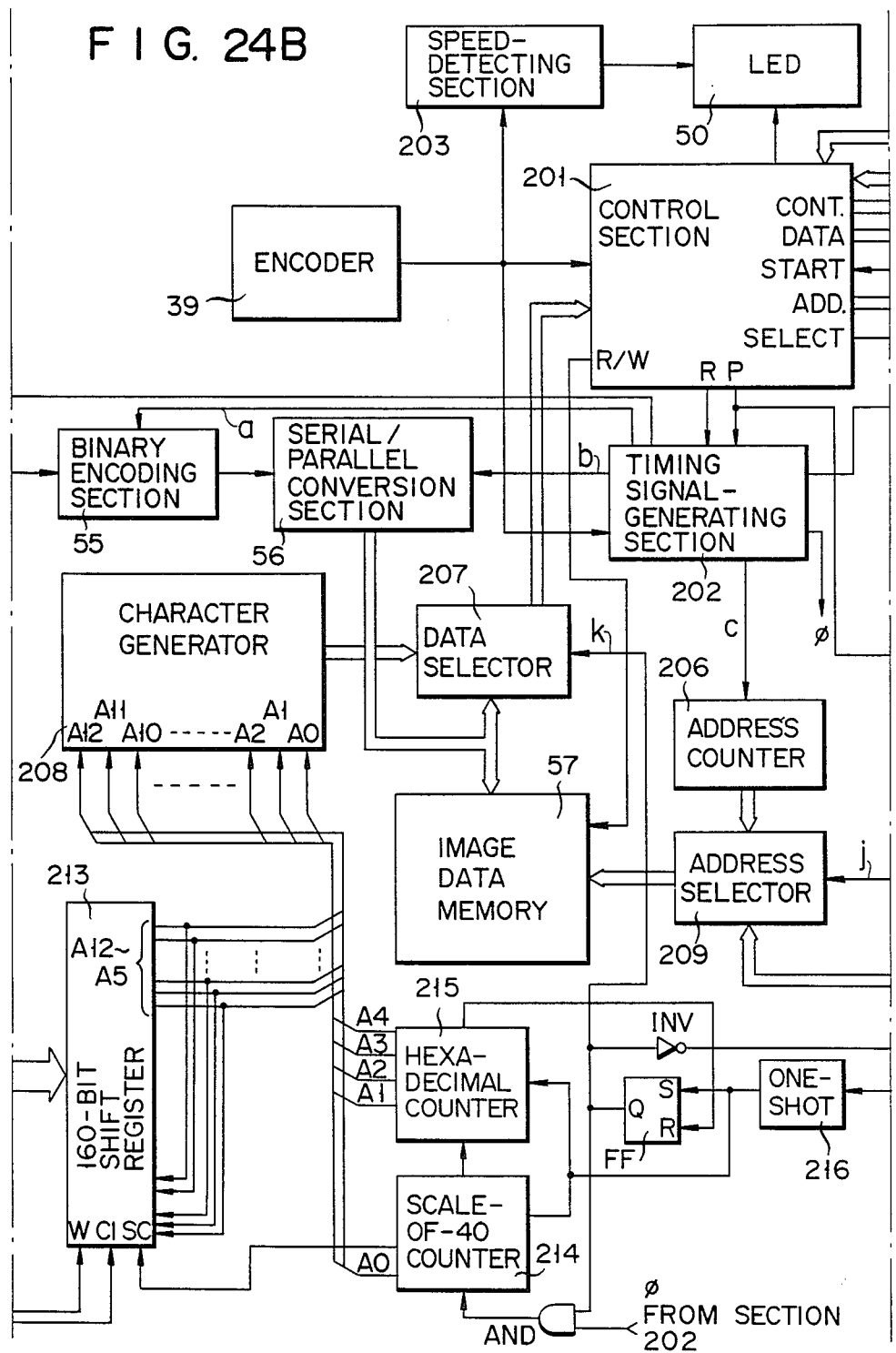
Figure 24C:
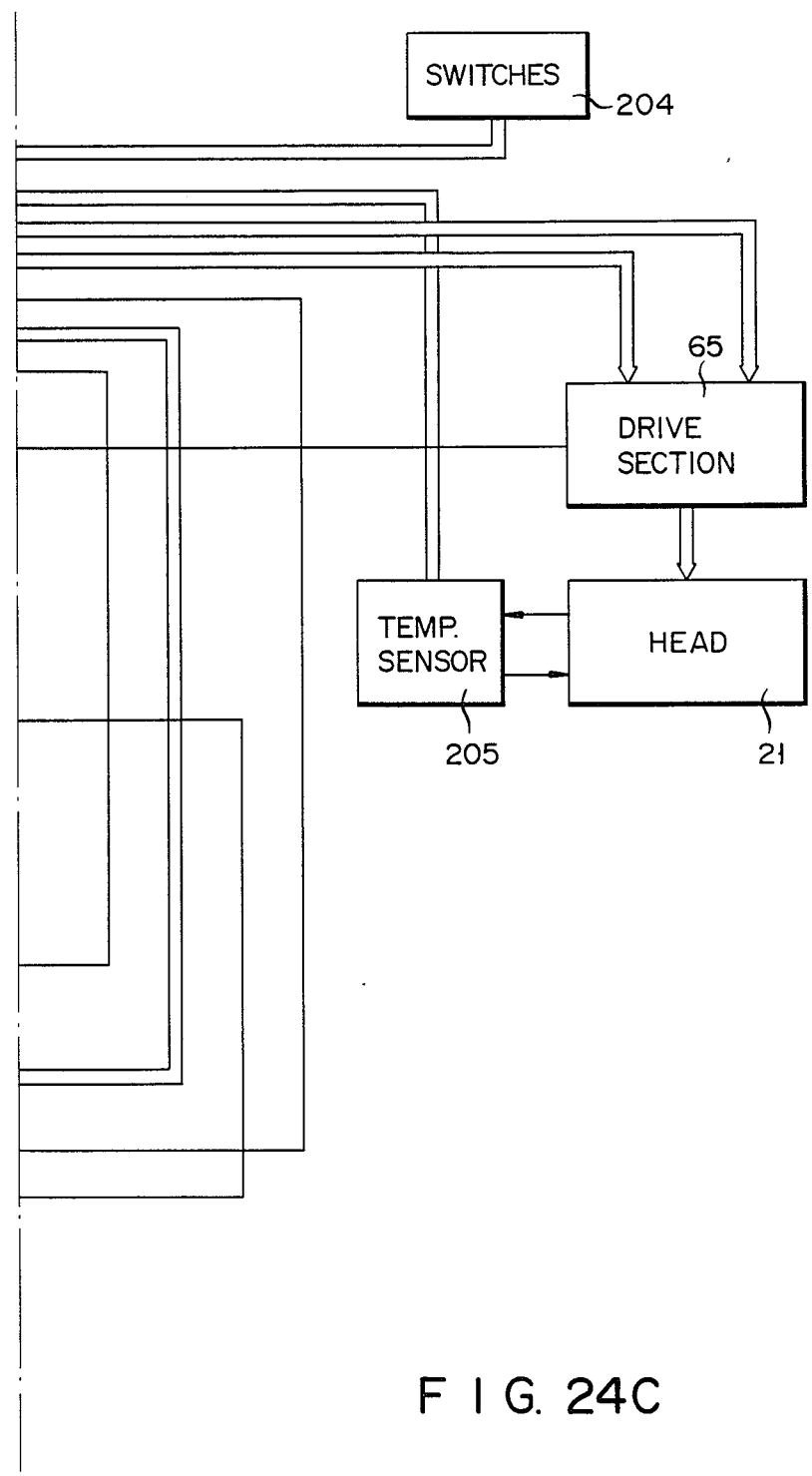

Housing 200 contains an electronic circuit, which will be explained with reference to FIGS. 24A to 24C. As is shown in FIGS. 24A to 24C, encoder 39 is located within housing 200. Encoder 39 outputs a pulse signal representing the distance over which the hand-held copier has been moved across an original or paper A. The output signal of encoder 39 is supplied t control section 201, timing signal-generating section 202, and speed-detecting section 203. Various signals are supplied to control section 201 from switch 4, operation switches 5a and 5b, clear key C, and density control dial 7. All these switches and keys will be hereinafter generally referred to as "switches 204." Further, a temperature signal is supplied to control section 201 from temperature sensor 205 which detects the temperatures of thermal head 21 and paper A. Control section 201 is provided with a power-supply voltage detector (not shown). In response to the signals supplied from switches 204, control section 201 controls LEDs 8 and 9 of LED section 50, and other components of the hand-held copier. When the copier is set in the reading mode, section 201 supplies an operation command R to timing signal-generating section 202. When the copier is set in the printing mode, section 201 supplies an operation command P to timing signal-generating section 202.

In response to operation command R from control section 201, timing signal-generating section 202 generates a CCD-exposure timing signal representing the timing at which the CCD elements of line image sensor 15 are exposed to light, one after another. Section 202 also produces signals in synchronism with the pulses output by encoder 39, such as read-timing signal "a", serial-to-parallel conversion signal "b", and clock pulses "c". Further, in response to operation command P supplied from control section 201, section 202 generates a print-timing signal.

The CCD-exposure timing signal output by timing signal-generating section 202 is supplied to line image sensor 15. Read-timing signal "a" is supplied to binary encoding section 55. Serial-to-parallel conversion signal "b" is input to serial-to-parallel conversion section 56. Clock pulses "c" are supplied to address counter 206.

Line image sensor 15 receives the light reflected from original B, in synchronism with the pulses of the CCD-exposure timing signal, and generates an electric signal. This electric signal is supplied via amplifier 54 to binary encoding section 55. Section 55 converts the input signal into binary signals, each representing either "black" or "white", in synchronism with the pulses of read-timing signal "a". The binary signals are input to serial-to-parallel conversion section 56. Section 56 converts the binary signals into, for example, an 8-bit parallel signal. The parallel signal is input to image data memory 57.

Data selector 207 is connected between image data memory 57 and control section 201. Data selector 207 selects the data supplied from character generator 208 or image data memory 57, in accordance with select signal "k" supplied from flip-flop FF. Read/write signal R/W is supplied to image data memory 57 from control section 201 in response to the read mode or print mode of the hand-held copier. Write address are supplied to image data memory 57 from address counter 206 through address selector 209. Read address are supplied to memory 57 from control section 201 through address selector 209. Control section 201 supplies select signal "j" to address selector 209. In response to select signal "j", address selector 209 selects address counter 206 when the copier is set in the reading mode, and selects control section 201 when the copier is set in the printing mode, thereby to designating a write address or a read address of image data memory 57.

The character data input by operating key-input section 200a is supplied via key-input control section 210 to 160-bit input buffer 211. This buffer 211 can store twenty 8-bit character codes. The character data is then supplied from buffer 211 to display control section 212, and is displayed by display section 200b. Input buffer 211 is connected to 160-bit shift register 213. Write signal W is supplied to this shift register 213 from key-input control section 210 when execution key EXE of key-input section 200a is operated. In response to write signal W, shift register 213 stores the character data which has been input by operating key-input section 200a. The character data stored in shift register 213 is erased when clear signal Cl is supplied to shift register 213 by operating clear key C of key-input section 200a. The 8-bit character codes are output from shift register 213 to character generator 208, one by one through eight data lines A5 to A12. Character generator 208 stores character data representing character patterns, each consisting of 16×16 bits. The address at which each character pattern is stored is designated by the address data supplied via address lines A0 to A4 from scale-of-40 counter 214 and hexadecimal counter 215. Scale-of-40 counter 214 outputs one shift clock pulse SC to shift register 213 every time it counts two bits. Counter 214 counts the clock pulses $\phi$ supplied from timing signal-generating section 202 via an AND gate, when flip-flop FF is set. Flip-flop FF is set by the output pulse of one-shot circuit 216 triggered by operation command P output from control section 201. Counter 215 counts carries from scale-of-40 counter 214. The carry signal output by hexadecimal counter 215 is supplied to reset terminal R of flip-flop FF. The Q output signal of flip-flop FF is supplied as select signal "k" to data selector 207, and also as an addressing start signal to control section 201 via inverter INV. The output signal of one-shot circuit 216 is also supplied to reset terminals R of counters 214 and 215.

Assume that the hand-held copier is set to the printing mode after the character data has be prepared and the image has been read from the original. Then, control section 201 outputs operation command P to timing signal-generating section 212 and one-shot circuit 216. Section 201 reads out, in response to the output pulses of encoder 39, all character data from character generator 208 and image data from image data memory 57, through data selector 207. Then, control section 201 calculates the time for supplying power to thermal head 21, on the basis of the temperature of head 21, which has been detected by temperature sensor 205, the voltage detected by the power-supply voltage detector, and the density selected by turning density control dial 7. Section 201 supplies print data, indicating the time for supplying power to thermal head 21, to thermal head drive circuit 65. Thermal head drive circuit 65 drives thermal head 21 in accordance with the print data, in synchronism with the print-timing signals supplied from timing signal-generating section 202.

FIGS. 25 shows in detail scale-of-40 counter 214 and hexadecimal counter 215. As has been described, one-shot circuit 216 outputs a signal when the hand-held copier is set in the printing mode, and control section 201 therefore supplies operation command P to one-shot circuit 216. The output signal of circuit 216 is supplied to reset terminals R of scale-of-40 counter 214 and hexadecimal counter 215. Hence, scale-of-40 counter 214 starts counting clock pulses $\phi$. At this time, data selector 207 selects character generator 208 in response to select signal "k".

Counter 214 comprises inverters INV1 to INV4, AND gates AND1 to AND7, exclusive-OR gates EOR1 to EOR5, and OR gate OR1. Every time counter 214 counts one bit, address "0" or "1" is supplied to character generator 208 through address line A0. Every time counter 214 counts two bits, shift clock pulse SC is supplied to 160-bit shift register 213 through inverter INV5, one-shot circuits 214a and 214b, and OR gate OR2. Whenever counter 214 counts 40 bits, it outputs a carry signal (a clock pulse) to hexadecimal counter 215. The count value of hexadecimal counter 215 increases by one every time scale-of-40 counter 214 counts 40 bits. The count value of hexadecimal counter 215 is supplied to character generator 208 through address lines A1 to A4, in the form of 4-bit data.

Figures 26, 27:
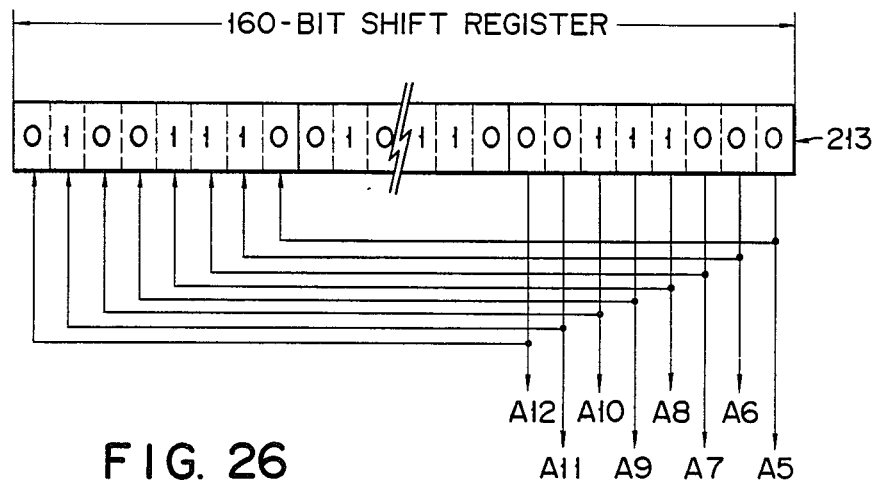
FIG. 26 is a diagram schematically showing a character code latched in the 160-bit shift register shown in FIGS. 24A to 24C.
FIG. 27 is a diagram schematically illustrating the address of the character data stored in the character generator shown in FIGS. 24A to 24C.
Figure 28:
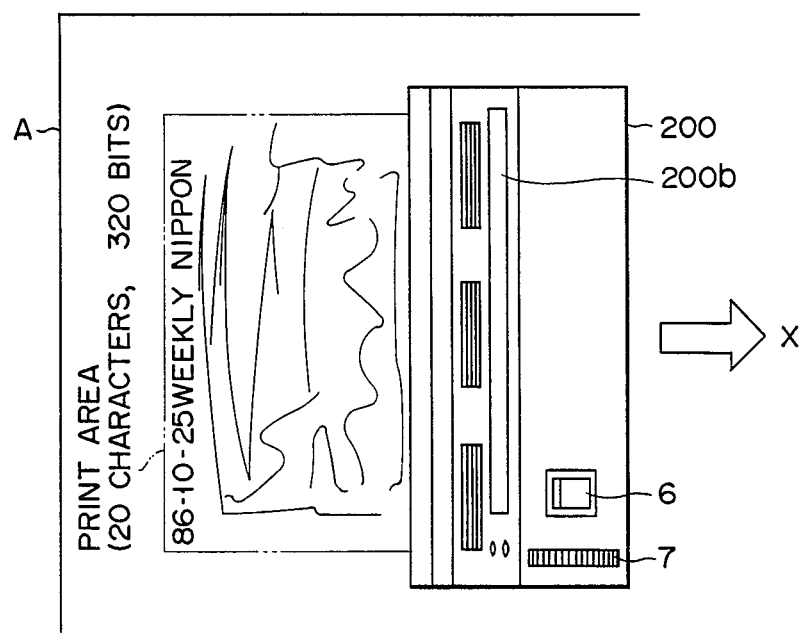
FIG. 28 is a diagram showing how character data and image information are simultaneously printed by means of the hand-held copier of FIG. 23.

FIG. 26 schematically illustrates the 8-bit character codes stored in 160-bit shift register 213. As can be understood from this figure, each 8-bit character code to be output via data lines A5 to A12 is shifted whenever scale-of-40 counter 214 outputs shift clock pulse SC upon counting two bits.

FIG. 27 schematically shows character pattern data of "1" stored in character generator 208. This character pattern data consists of 16×16 bits. This data, 16×16 bit-matrix pattern, is divided into a left-half and a right half, each consisting of 8×16 bits. The left-half of this data is designated by address "0" supplied from scale-of-40 counter 214 through address line A0. The right-half is designated by address "1" supplied from counter 214 via address line A0. The 16 bit of each column of either data half are designated by the 4-bit address data (A1-A4) output from hexadecimal counter 215. Therefore, when the 1-bit address (A0) is "0", whereas the 4-bit address (A1-A4) output from hexadecimal counter 215 is "0000," the eight bits of the first row of the left-half of the 16×16 bit-matrix pattern are read out from character generator 208, and when the 1-bit address (A0) changes to "1", the eight bits of the first row of the right-half of the same bit-matrix pattern are read from character generator 208. Then, counter 214 outputs a shift clock pulse SC to 160-bit shift register 213. In response to this pulse SC, shift register 213 supplies the next character code to character generator 208. As a result, the eight bits of the first row of the left-half of the second 16×16 bit-matrix pattern are read from character generator 208, and then the eight bits of the first row of the right-half of the second bit-matrix pattern are read from character generator 208. Therefore, when such an eight-bit reading is repeated 40 times, the first rows of 20 character bit-matrix patterns are read out from character generator 208.

Then, the 8-bit address (A1-A4) output by hexadecimal counter 215 changes to "0001." As a result, the second rows of the 20 character bit-matrix patterns are read from character generator 208. Thereafter, the third to sixteenth rows of the 20 character patterns are read from character generator 208, one after another. Hence, all key-input data for twenty characters is read from character generator 208 through data selector 207.

The operation of the third embodiment (FIG. 23) will now be explained. In order to read image data from original B. As in the case of the first embodiment, the user moves switch 4 to a "read" position. Then, power is supplied to the electronic circuit of the hand-held copier. The user holds the copier and sweeps it across original B, while depressing both operation switches 5a and 5b and keeping reading section 2 in contact with original B, as is shown in FIG. 2B. As the copier is moved forward, the light emitted from light source 11 is applied to original B through reading window 12 cut in inclined surface 1a. The light is reflected from original B, guided by light guide 13, and applied through lens 14 to line image sensor 15. The output signal of encoder 39 is supplied to control section 201, timing signal-generating section 202, and speed-detecting section 203.

Meanwhile, when operation command R is input to timing signal-generating section 202 from control section 201, section 202 starts supplying CCD-exposure timing pulses at regular intervals to line image sensor 15. Further, section 202 generates read-timing signal "a" and serial-to-parallel conversion signal "b" in accordance with the output signal of encoder 39. Read-timing signal "a" is input to binary encoding section 55, and serial-to-parallel conversion signal "b" is input to serial-to-parallel conversion section 56. Timing signal-generating section 202 generates clock pulses "c" in synchronism with serial-to-parallel conversion signal "b". Clock pulses "c" are supplied to address counter 202.

Line image sensor 15 produces image signals from the light reflected from original B, in synchronism with the CCD-exposure timing signal output from timing signal-generating section 202. The timing signal is amplified by amplifier 54 and then supplied to binary encoding section 55. Binary encoding section 55 converts the image signals to digital signals, in synchronism with read-timing signals "a". The digital signals are input to serial-to-parallel conversion section 56. Section 5 converts the digital signals to items of 8-bit parallel image data, in synchronism with serial-to-parallel conversion signals "b". The image data, thus provided, is input to image data memory 57. The addresses of image data memory 57 can be designated by address selector 209. Address selector 209 has selected address counter 206 in response to select signal "j". Therefore, the count value of address counter 206 designates the address of image data memory 57. The count value of address counter 206, more precisely the column address thereof, is incremented by one every time clock pulse "c" is supplied to counter 206 from timing signal-generating section 202. Hence, the one line of the image data is written into image data memory 57. Then, timing signal-generating section 202 stops generating clock pulse "c" until it receives the next pulse from encoder 39. As the copier is further moved, encoder 39 supplies other pulses to section 202, whereby section 202 supplies clock pulse "c" to address counter 206. Therefore, the other lines of the image data are sequentially written into image data memory 57. Thus, all image data read from original B is written into image data memory 57.

To print the image data on a sheet of paper, along with a message such as the date of reading the image or a caption for this image data, the user operates the numeral keys and alphabet keys of key-input section 200a, thereby inputting character data consisting of 20 characters at most. This character data is displayed by display section 200b. When the user pushes execution key EXE, this character data, e.g., 20-character data "86-10-25WEEKLYNIPPON", is written into 160-bit shift register 213. More specifically, twenty 8-bit character codes are written into shift register 213, one after another. Hence, the image data, which has been read from original B, is written into image data memory 57, whereas the 20-character data is written into 160-bit shift register 213.

It will now be explained how the hand-held copier of the third embodiment (FIG. 23) is operated to print the image data, together with the character data input by operating key-input section 200a. First, the user moves switch 4 to the "print" position. Then, power is supplied to the electronic circuit, and the copier is set in the printing mode. Control section 201 therefore outputs operation command P, and supplies select signal "e" to address selector 209. The user holds the copier and sweeps it across paper A in the direction of arrow X, while depressing both operation switches 5a and 5b and keeping printing section 3 in contact with paper A. As housing 200 of the hand-held copier is moved, ink ribbon 22a (see FIGS. 2A and 2B) is fed at the same speed as housing 200 is swept across paper A.

The pulse signal output from encoder 39 is supplied to control section 201 and timing signal-generating section 202. In response to the pulses supplied from encoder 39, timing signal-generating section 202 outputs print-timing signals to thermal head drive circuit 65.

In the meantime, the twenty character codes written in 160-bit shift register 213 are supplied to character generator 208 in response to shift clock pulses SC output by scale-of-40 counter 214. Upon receipt of each clock pulse SC, address A0 is changed from "0" to "1." As a result, one row of each character pattern is read, in the form of two 8-bit data pieces, from character generator 208 and supplied to control section 201 through data selector 207. When the character data for the twenty characters (320 bits/row) is read from character generator 208, this data is supplied to thermal head drive circuit 65. Control section 201 then calculates the time for supplying power to thermal head 21, on the basis of the number of characters to be printed, the temperature of head 21, which has been detected by temperature sensor 205, the voltage detected by the power-supply voltage detector, and the density selected by turning density control dial 7. Thermal head drive circuit 65 drives thermal head 21 in accordance with the control data from control section 201 and the timing signals from timing signal-generating section 202. Thermal head 21 prints the character data on paper A, by using ink ribbon 22a. As housing 200 of the hand-held copier is moved across paper A, the unused portion of ink ribbon 22a is fed from roll 22, and the used portion of ribbon 22a is taken up around ribbon take-up roller 24. Every time hexadecimal counter 215 counts up, the 4-bit address (A1–A4) changes, for example, from "0001" to "0010," one row of 16×16 matrix pattern for each of the twenty character is read out from character generator 208. The first to sixteenth row of 16×16 matrix pattern for each character are sequentially read from character generator 208, whereby the 20-character data input by operating key-input section 200a is printed on paper A.

When the 20-character data is thus printed, hexadecimal counter 215 outputs a carry signal, which resets flip-flop FF. The Q output of flip-flop FF is supplied as select signal "k" to data selector 207, whereby data selector 207 selects image data memory 57. Then, control section 201 designates the row-addresses and column-addresses of memory 57, one after another, in response to the output pulses of encoder 39. Hence, the first line of the image data is read from image data memory 57 and supplied to thermal head drive circuit 65 through data selector 207. As in the case of printing the character data, control section 201 calculates the time for supplying power to thermal head 21, from the number of dots to be printed, the temperature of head 21, the voltage detected by the power-supply voltage detector, and the density selected by turning density control dial 7. Thermal head 21 prints the image data on paper A after the 20-character data already printed on paper A, by using ink ribbon 22a.

As has been explained above, the hand-held copier of the third embodiment can print image data, which has been read from an original, along with a message which has been input by operating key-input section 200a. Therefore, the message, e.g., the date of reading the image data or the caption therefor, need not be handwritten on the printed image.

A fourth embodiment of the present invention will be described.

In the third embodiment (FIGS. 23 and 24A to 24C), the character data input by operating key-input section 200a is read out from character generator 208, supplied to thermal head drive circuit 65 through data selector 207 and control section 201, and is printed on paper A at the first line. The hand-held copier of the fourth embodiment is designed such that the character data is temporarily stored in image data memory 57, along with the image data read from an original B, and can thus be printed on paper A, at the last line, superposed on the image data.

In the third embodiment control section 201 supplies operation command R to one-shot circuit 216. Signal "c" is input to address counter 206. However, in the fourth embodiment signal "c" and an output signal of And gate AND are input to OR gate. An output of the OR gate is supplied to address counter 206 instead of signal "c". Command R is inverted by an invertor. The inverted command is supplied to one-shot circuit instead of command R. When the hand-held copier is set in the reading mode, output signal of flip-flop FF is low level, so no clock pulses ϕ are supplied from timing signal-generating section 202 to scale-of-40 counter 214. The image data output from line image sensor 15 through serial-to-parallel conversion section 56 is written into image data memory 57 through data selector 207. When all image data has been written into memory 57, operation command R supplied from control section 201 falls to a low level. In response to inverted command R, one-shot circuit 216 outputs a pulse. Flip-flop FF are set. Hence, clock pulses ϕ are supplied to scale-of-40 counter 214 and counter 214 starts counting clock pulses ϕ. The character data is read out from character generator 208 in synchronism with these clock pulses ϕ. The character data, thus read, is written into image data memory 57, at the address next to the addresses where the image data has been written. Hence, when the copier is set in the printing mode, the character data is read from memory 57 after the image data has been read therefrom, and is, therefore, printed on paper A after the image has been printed thereon.

A fifth embodiment of the present invention will now be described with reference to FIGS. 29 and 30A to 30C.

As has been described, the third and fourth embodiments are designed such that character data, such as the date or caption for the image data, is input by operating key-input section 200a and printed on paper A together with the image data read from an original B. In contrast, the hand-held copier of the fifth embodiment is so designed that the date is automatically printed along with the image data.

Figure 29:
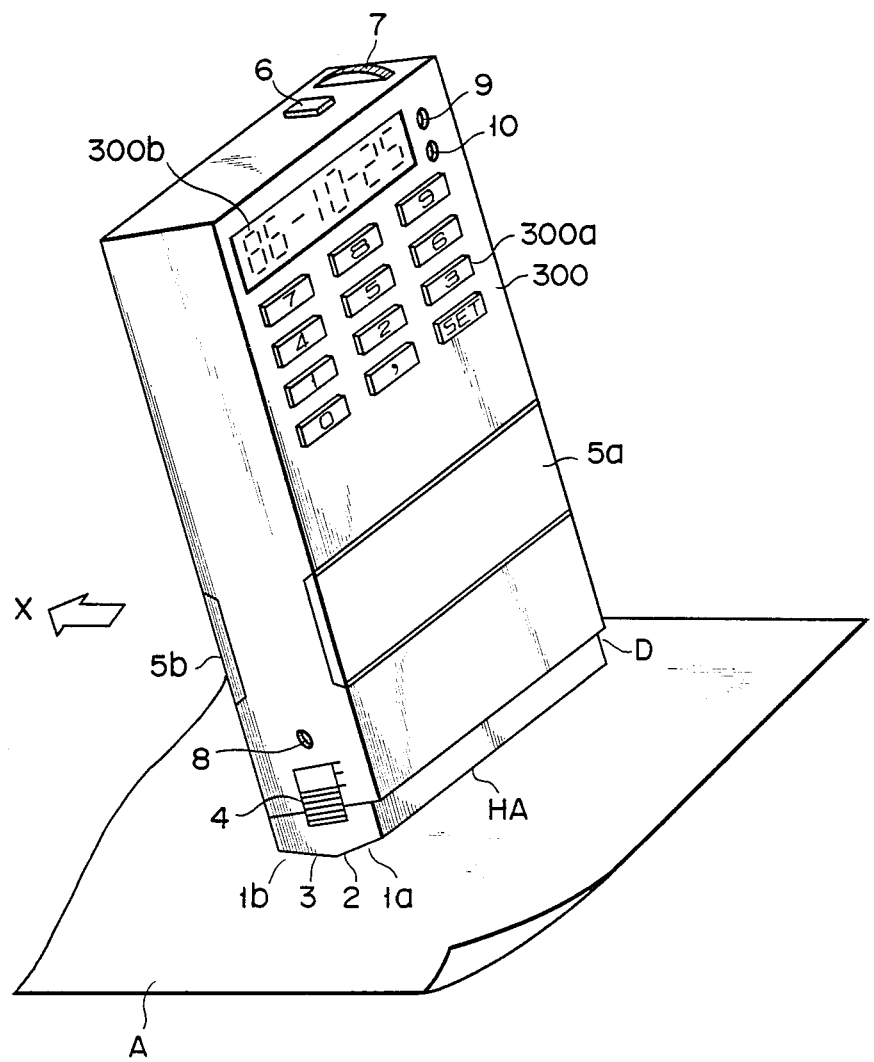
FIG. 29 is a perspective view showing a hand-held copier according to a fifth embodiment of this invention.

As shown in FIG. 29, hand-held copier 300 of the fifth embodiment has key-input section 300a and display section 300b. Key-input section 300a has numeral keys, a decimal-point key, and a set key SET. These keys are operated, thereby to set various counters (later described) to the correct date. Display section 300*b* is used to display the date which is represented by the outputs data of the counters.

Figure 30A:
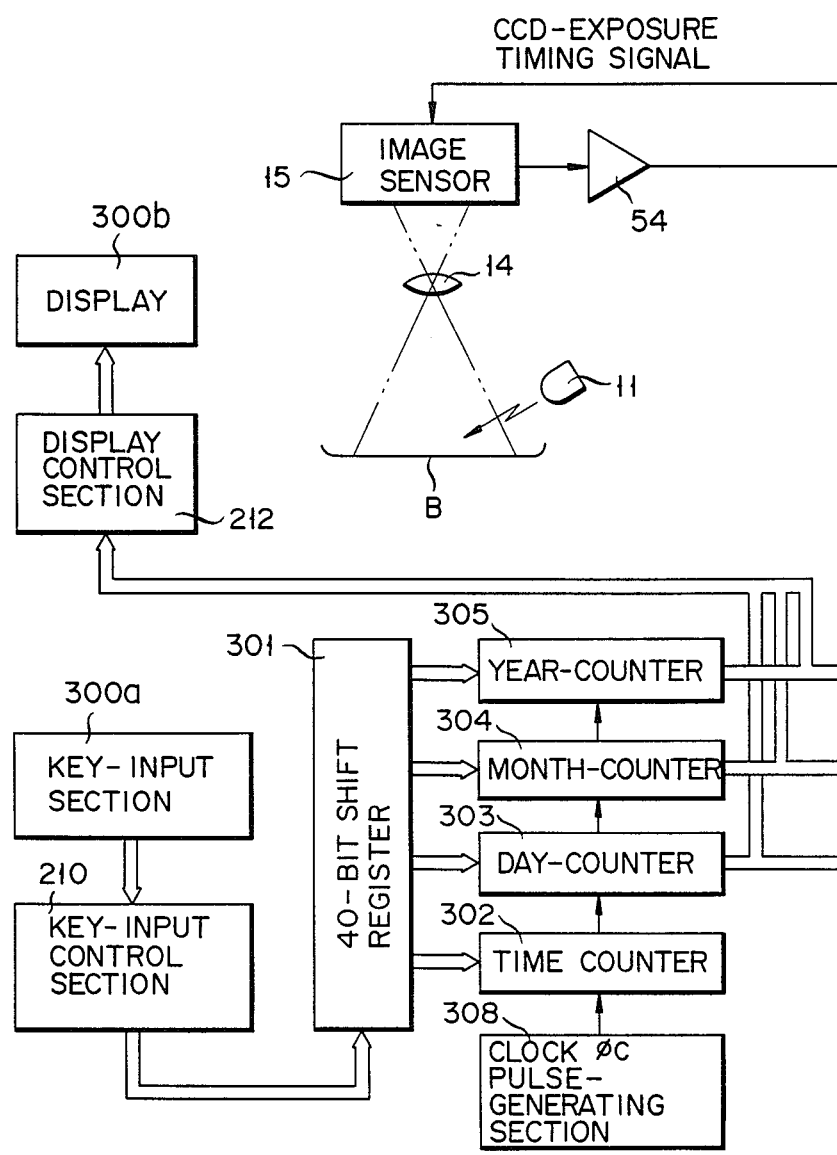
FIGS. 30A to 30C are block diagrams illustrating the electronic circuit provided within the hand-held copier of FIG. 29.
Figure 30B:
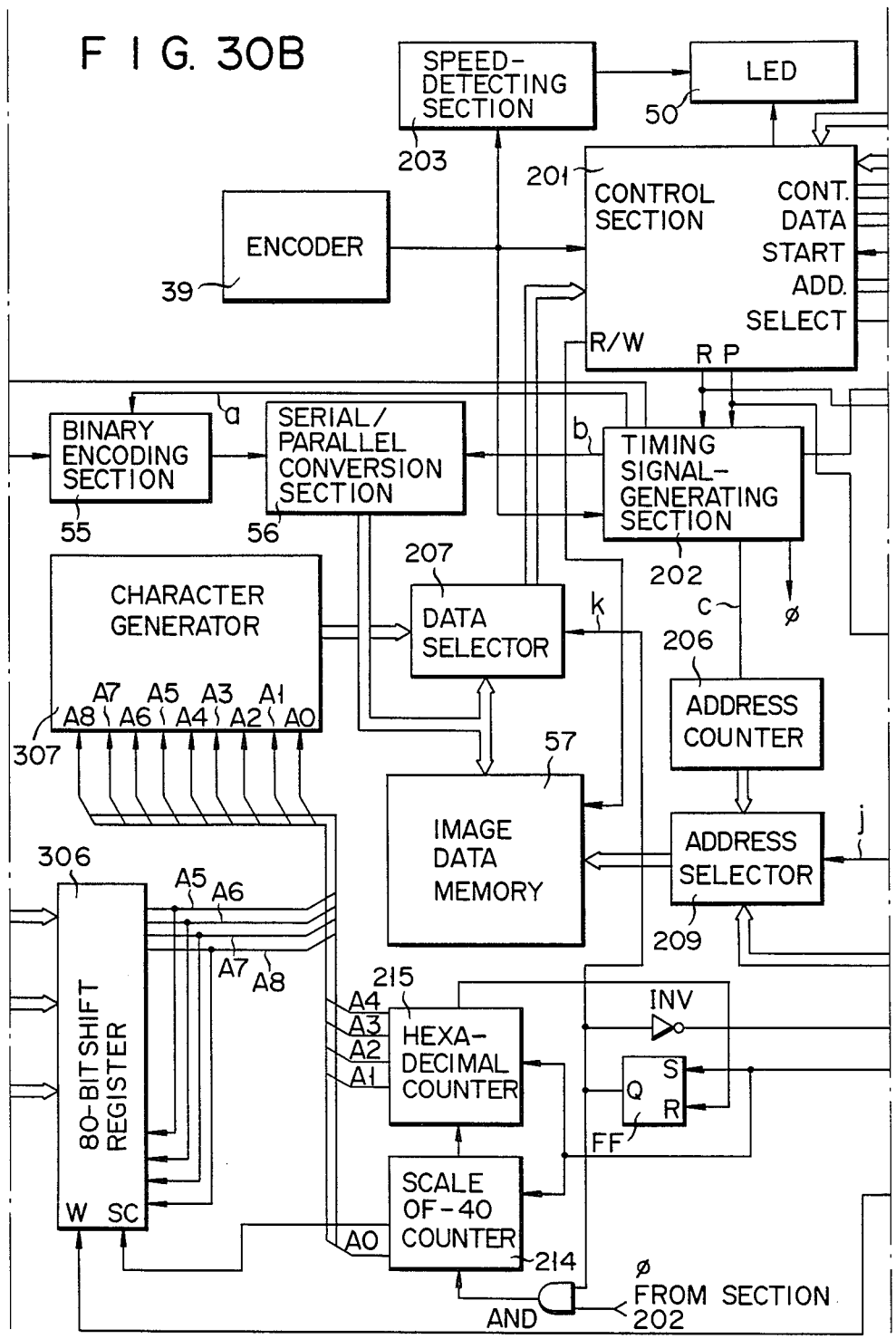
Figure 30C:
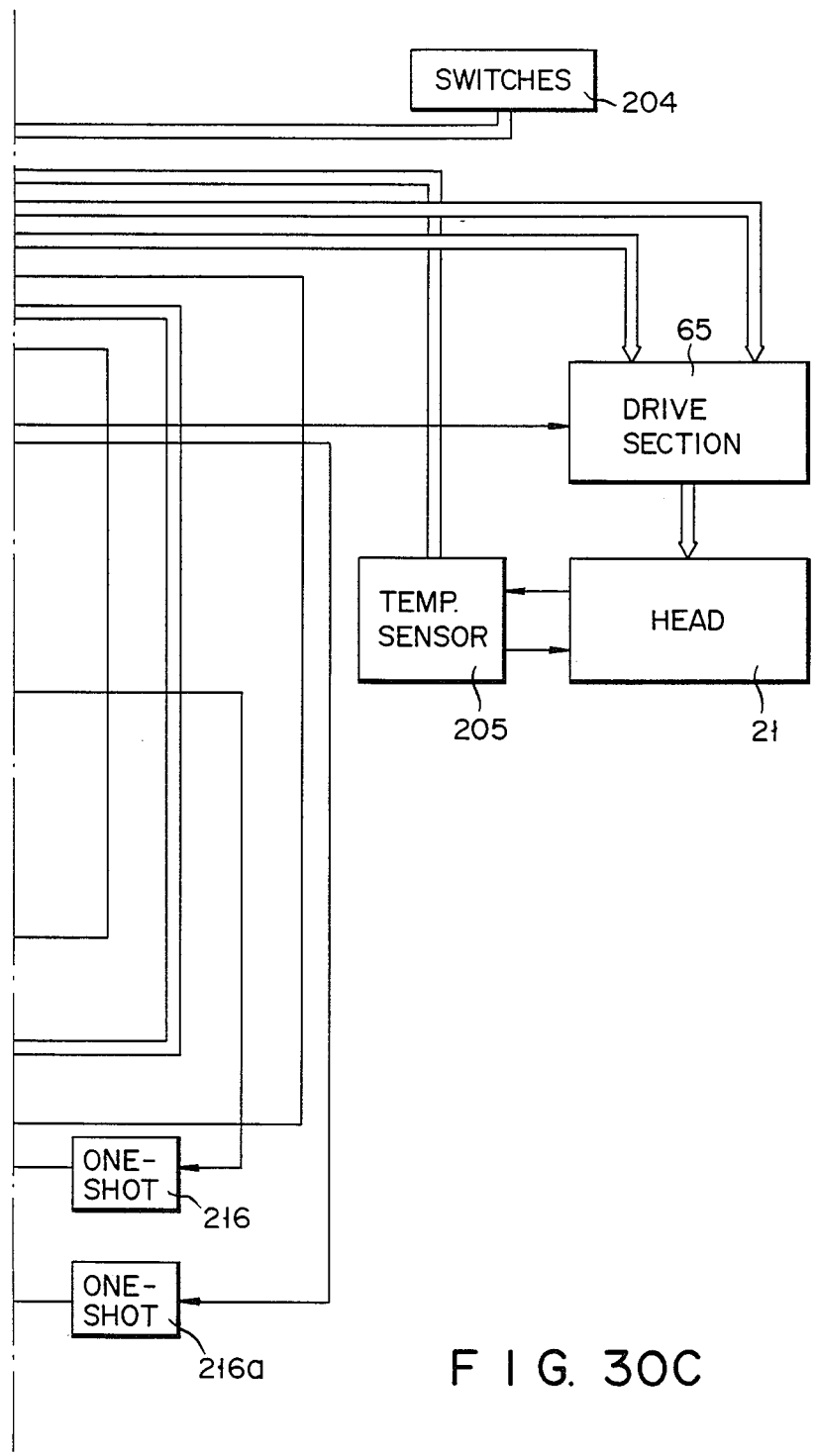

FIGS. 30A to 30C show the electronic circuit provided within copier 300. Assume that a user pushes 8 key, 6 key, - key, 1 key, 0 key, - key, 2 key 5 key, and finally set key SET, thereby inputting the date of "October 25, 1986." The date data, thus input, is stored in 40-bit shift register 301 through key-input control section 210. The 40-bit shift register 301 is capable of storing ten 4-bit character codes. Data "25" is set in day-counter 303, data "10" is set in month-counter 304, and data "86" is set in year-counter 305. Clock pulse-generating section 308 supplies time clock pulses $\phi$ to time counter 302. Whenever time counter 302 counts one day, it generates a carry signal. This carry signal is supplied to day-counter 303. Whenever day-counter 303 counts one month, it outputs a carry signal to month-counter 304. Whenever month-counter 304 counts one year, it outputs a carry signal to year-counter 305. The counts values of counters 303, 304 and 305 form date data (the year, month, and day). This date data is supplied to display control section 212 and displayed by display section 300*b*.

When control section 201 outputs operation command R, one-shot circuit 216*a* generates write signal W, which is supplied to 80-bit shift register 306. Then, the date data is written into 80-bit shift register 306. Of the eighty bits of register 306, the first 32 bits represent the date, i.e., eight 4-bit character codes. The remaining 48 bits, therefore, form 12 blank character codes. The 4-bit character codes (including the blank character codes) are shifted and output from 80-bit shift register 306 to character generator 307 through data lines A5 to A8, one by one. Character generator 307 stores data representing numeral patterns, each being 16×16 bit matrix. Each of these numeral patterns are addressed by one-bit address data (A0) supplied from scale-of-40 counter 214 and 4-bit address data (A1 to A4) supplied from hexadecimal counter 215.

Scale-of-40 counter 214 outputs a shift clock pulse SC to shift register 306 every time it counts two bits. When control section 201 outputs operation command P, one-shot circuit 216 sets flip-flop FF. Flip-flop FF supplies a Q output signal to AND gate AND. Therefore, clock pulses $\phi$ are supplied though the AND gate to scale-of-40 counter 214. Whenever counter 214 counts 40 clock pulses $\phi$, it outputs a carry signal, which is input to hexadecimal counter 215. Whenever hexadecimal counter 215 counts 16 carry signals from counter 214, it outputs a carry signal to the reset terminal R of flip-flop FF. In the meantime, the Q output signal of flip-flop FF is supplied as select signal "k" to data selector 207, and as an address-start signal to control section 210 through inverter INV. The output signal of one-shot circuit 216 is also supplied to the reset terminals R of counters 214 and 215. Meanwhile, write signal W is supplied to 80-bit shift register 306 from one-shot circuit 216*a* when control section 201 outputs operation command R.

Thus, the date data has been input, and the image data has been read from original B. When the hand-held copier is set in the printing mode thereafter, control section 20 outputs operation command P to timing signal-generating section 202 and one-shot circuit 216, as has been described above. In response to the pulse signal supplied from encoder 39, which represents the distance copier 300 has been moved across paper A, control section 201 reads the character data from character generator 307 and the image data from image data memory 57, through data selector 207. Then, control section 201 calculates the time for supplying power to thermal head 21, on the basis of the temperature of head 21, which temperature sensor 205 has detected, the voltage detected by a power-supply voltage detector (not shown), and the density selected by turning density control dial 7. Further, section 201 supplies the character data and the image data to thermal head drive circuit 65. This drive circuit 65 drives thermal head 21 in accordance with the character data and the image data, in synchronism with the print-timing signals supplied from control section 201.

Figure 31:
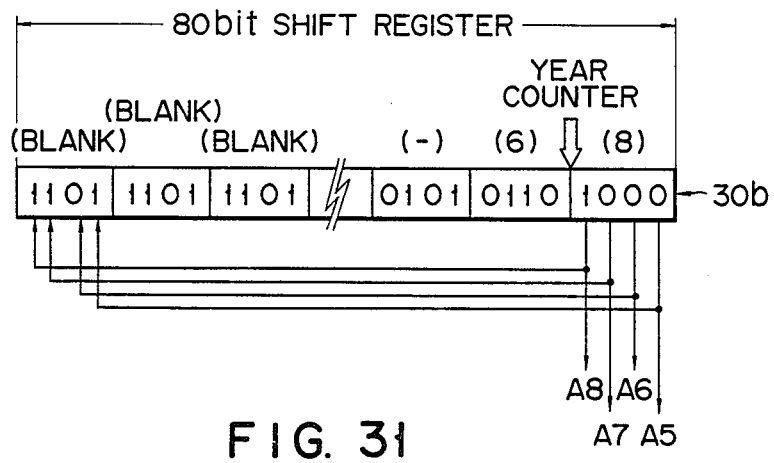
FIG. 31 is a diagram schematically representing a character code latched in the 80-bit shift register shown in FIG. 30.

FIG. 31 schematically shows the 4-bit character codes stored in 80-bit shift register 306. As may be understood from this figure, the character codes (including the blank codes) are sequentially shifted within register 306 as shift clock pulses SC are input to this register 306.

In hand-held copier 300, when control section 201 outputs operation command R in the reading mode, write signal W is supplied to 80-bit shift register 306 through one-shot circuit 216*a*. Then, the date data, e.g., "86-10-25" showing the date is written from counters 303, 304 and 305 into 80-bit shift register 306. More specifically, eight 4-bit character codes are written as the first 32 bits of shift register 306, and twelve 4-bit blank character codes are written as the remaining 48 bits of shift register 306.

Figure 32:
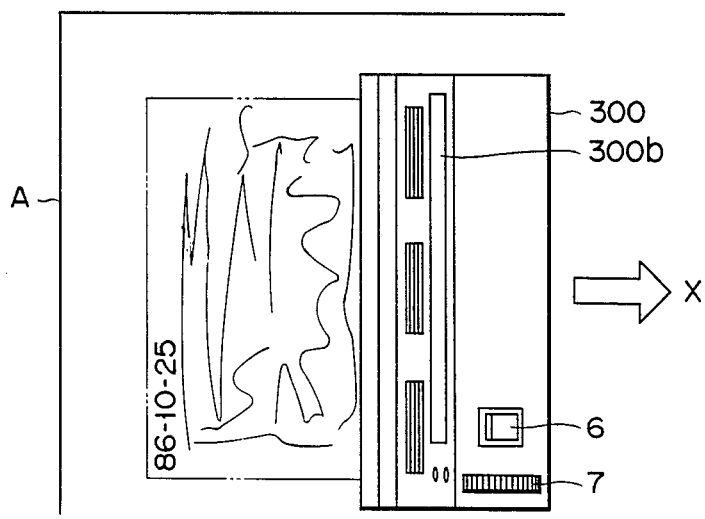
FIG. 32 is a diagram explaining how character data and image information are simultaneously printed by the hand-held copier shown in FIG. 29.

After the image data has been written into image data memory 57, the user sets the hand-held copier 300 in the printing mode. Then, control section 210 outputs operation command P to one-shot circuit 216. One-shot circuit 216 sets flip-flop FF and resets scale-of-40 counter 214 and hexadecimal counter 215. Flip-flop FF supplies a Q output signal to AND gate AND. As a result, clock pulses $\phi$ are input to scale-of-40 counter 214 through the AND gate. Counter 214 starts counting these clock pulses $\phi$. Every time it counts one pulse, it supplies one shift clock pulse SC to 80-bit shift register 306. Every time it counts two bits, counter 214 outputs a 1-bit address data (A0) to character generator 307. Whenever it counts 40 bits, counter 214 outputs one carry signal to hexadecimal counter 215. In response to each carry signal from scale-of-40 counter 214, hexadecimal counter 215 outputs a 4-bit address data (A1–A4) to character generator 307. As the 1-bit addresses and 4-bit addresses are supplied to character generator 307, the 8-character date data is read from character generator 307 and supplied to thermal head drive circuit 65 through data selector 207 and control section 201. Therefore, thermal head 21 first prints the date "86-10-25" on paper A and then the image on paper A, as is illustrated in FIG. 32.

What is claimed is:

1. A manual sweeping apparatus including a manually movable housing, comprising:
   image information input means for producing image information signals while said housing is manually swept across a material having image information thereon;
   first memory means for storing the image information signals produced by said image information input means;
   character-generating means for generating character pattern signals;
   signal-combining means for combining the image information signals stored in said first memory means and character pattern signals generated by said character-generating means, and for producing combined signals;

secondary memory means for storing the combined signals produced by said signal-combining means;

printing means for printing information according to the combined signals stored in said second memory means;

position-detecting means for detecting a position of said housing being swept across said material, and for producing a signal every time said housing is swept over a predetermined distance, said signal representing the position of said housing with respect to said material; and printing-control means for activating said printing means in synchronism with said signal produced by said position-detecting means.

2. The manual sweeping apparatus as claimed in claim 1, further comprising:

position-designating means for designating a position of the image information signals produced by said image information input means; and wherein said signal-combining means includes means for combining the character pattern signals generated by said character-generating means and signals corresponding to the position of the image information signals designated by said position-designating means.

3. The manual sweeping apparatus as claimed in claim 2, further comprising:

display means for displaying the image information according to the image information signals produced by said image information input means; and wherein said position-designating means includes means for designating a position on said display means, so as to designate the position of the image information signals.

4. The manual sweeping apparatus as claimed in claim 1, further comprising:

key input means for inputting character data; and wherein said character-generating means includes means for generating the character pattern signals according to character data input from said key-input means.

5. The manual sweeping apparatus as claimed in claim 4, further comprising:

third memory means for storing character data input from said key-input means; and wherein said character-generating means includes means for generating the character pattern signals according to the character data output from said third memory means.

6. The manual sweeping apparatus as claimed in claim 5, further comprising:

display means for displaying the image information according to the image information signals output from said first memory means;

position-designating means for designating a position in the image information being displayed by said display means; and key-input control means for storing character data input from said key-input means at a position in said third memory means according to the position designated by said position-designating means.

7. The manual sweeping apparatus as claimed in claim 6, wherein said display means includes means for displaying the image information corresponding to the image information signals output from said first memory means and a character pattern corresponding to said character pattern signals generated by said character-generating means.

8. The manual sweeping apparatus as claimed in claim 1, further comprising:

display means for displaying the image information according to the image information signals output from said first memory means;

designating means for designating a portion of the image information displayed by said display means; and transfer means for transferring a portion of the image information signals, which is designated by said designating means, from said first memory means to said signal-combining means, whereby said signal-combining means combines the portion of the image information signals transferred by said transfer means and the character pattern signals generated by said character-generating means.

9. The manual sweeping apparatus as claimed in claim 8, wherein said first memory means includes;

basic memory means for storing the image information signals produced by said image information input means; and edit memory means for storing some of said image information signals stored in said basic memory means, which is designated by said designating means; and said transfer means includes means for transferring the image information signals designated by said designating means, from said basic memory means to said edit memory means, and for transferring the image information signals stored in said edit memory means to said signal-combining means.

10. The manual sweeping apparatus as claimed in claim 1, wherein said image information input means includes photoelectric converting means for converting the image information on said material into said image information signals while said housing is manually swept across said material, thereby allowing the image information from the material to be optically read.

11. The manual sweeping apparatus as claimed in claim 1, wherein said character-generating means includes:

time-measuring means for counting days, months and years;

date forming means responsive to said time-measuring means for forming date data; and converting means for converting the date data formed by said data forming means into character pattern signals.

12. A manually sweeping apparatus including a manually movable housing, comprising:

image information input means for producing image information signals while said housing is manually swept across a material having image information thereon;

memory means for storing the image information signals produced by said image information input means;

character-generating means for generating character pattern signals;

printing means for printing information according to the image information signals and the character pattern signals;

position-detecting means for detecting a position of said housing being swept across said material, and for producing a signal every time said housing is swept over a predetermined distance, said signal representing the position of said housing with respect to said material;

signal-transfer means for transferring the image information signals stored in said memory means and the character pattern signals generated by said character-generating means to said printing means in a predetermined order; and printing-control means for activating said printing means in synchronism with said signal output from said position detecting means.

13. The manual sweeping apparatus as claimed in claim 12, wherein said character-generating means includes:

time-measuring means for counting days, months and years;

date forming means responsive to said time-measuring means for forming date data; and converting means for converting the date data formed by said date forming means into the character pattern signals.

14. The manual sweeping apparatus as claimed in claim 13, wherein said character-generating means further includes:

date data transfer means for transferring the date data formed by said date forming means to said converting means when said printing means prints the information according to the image information signals and the character pattern signals.

15. The manual sweeping apparatus as claimed in claim 13, wherein said character-generating means further includes:

storing means coupled to said date forming means and to said converting means, for storing the date data formed by said date forming means; and date data transfer means for transferring the date data formed by said date forming means to said storing means when said image information input means produces image information signals, and for transferring the date data stored in said storing means to said converting means when said printing means prints information according to the image information signals and the character pattern signals.

16. The manual sweeping apparatus as claimed in claim 12, wherein said character-generating means includes:

key-input means for inputting character data;

storing means for storing character data input from said key-input means; and converting means for converting the character data output from said storing means into the character pattern signals.

17. The manual sweeping apparatus as claimed in claim 12, wherein said image information input means includes:

photoelectric converting means for converting image information formed on said material into said image information signals while said housing is manually swept across said material, thereby optically reading image information from said material.

18. A manual sweeping apparatus including a manually movable housing, comprising:

input means for producing image information signals while said housing is manually swept across a material having image information thereon;

position-detecting means for detecting the position of said housing being swept across said material, and for producing a signal every time said housing is swept over a predetermined distance, said signal representing the position of said housing with respect to said material;

character-generating means for generating character pattern signals;

signal-combining means for combining the image information signals produced by said input means with the character pattern signals generated by said character-generating means, and for producing combined signals;

output means for outputting the combined signals produced by said signal-combining means;

said signal-combining means comprising first memory means for storing said image information signals produced by said input means and the character pattern signals generated by said character-generating means;

memory-input control means for storing said image information signals and the character pattern signals at predetermined addresses of said first memory means; and memory-output control means for outputting data from said first memory means to said output means; said character-generating means comprising:

key-input means for inputting character data;

storing means for storing character data input by said key-input means, and for outputting character data; and converting means for converting character data output from said storing means, into character pattern signals;

second memory means for storing image information signals produced by said input means;

memory control means for controlling the writing of data into, and the reading of data out from, said second memory means, said memory control means including means for controlling the writing of data into said second memory means in accordance with the signals produced by said position-detecting means;

display means for displaying image information in response to the image information signals output from said second memory means;

designating means for designating a portion of the image information displayed by said display means; and transfer means for transferring said portion of the image information, which has been designated by said designating means, from said second memory means to said first memory means.

19. The manual sweeping apparatus as claimed in claim 18, wherein said memory-input control means includes means for controlling the inputting of image information signals to said first memory means in accordance with the signals produced by said position-detecting means.

20. The manual sweeping apparatus as claimed in claim 18, wherein said second memory means comprises:

basic memory means for storing the image information signals produced by said image information input means; and edit memory means for storing some of said image information signals stored in said basic memory means, which have been designated by said designating means; and said transfer means includes means for transferring the image information signals designated by said designating means from said basic memory means to said edit memory means, and for transferring these image information signals from said edit memory means to said first memory means.

21. The manual sweeping apparatus as claimed in claim 18, wherein said display means includes means for displaying the image information corresponding to the image information signals output from said second memory means, and for also displaying the character pattern corresponding to said character pattern signals output from said converting means.

22. The manual sweeping apparatus as claimed in claim 21, wherein said character-generating means further comprises:
   position-designating means for designating a position in the image information being displayed by said display means, at which the character data input by said key-input means is to be displayed; and
   key-input control means for storing the character data input by said key-input means, at that position in said storing means which has been designated by said position-designating means.

23. The manual sweeping apparatus as claimed in claim 22, wherein said input means includes photoelectric converting means for converting image information on said material into said image information signals while said housing is manually swept across said material, thereby optically reading the image information from said material.

24. The manual sweeping apparatus as claimed in claim 23, wherein said output means comprises:
   printing means for printing the signals output from said first memory means, on a printing medium while said housing is being manually swept across the printing medium;
   printer-driving means for driving said printing means in response to said signals output from said memory means and from said character-generating means; and
   printing-control means for controlling said printer-driving means in synchronism with the signals produced by said position-detecting means.

25. A manual sweeping apparatus including a manually movable housing, comprising:
   input means for producing image information signals while said housing is manually swept across a material having image information thereon;
   position-detecting means for detecting the position of said housing being swept across said material, and for producing a signal every time said housing is swept over a predetermined distance, said signal representing the position of said housing with respect to said material;
   character-generating means for generating character pattern signals;
   signal-combining means for combining the image information signals produced by said input means with the character pattern signals generated by said character-generating means, and for producing combined signals;
   output means for outputting the combined signals produced by said signal-combining means;
   said signal-combining means comprising:
      first memory means for storing said image information signals produced by said input means and the character pattern signals generated by said character-generating means;
      memory-input control means for storing said image information signals and the character pattern signals at predetermined addresses of said first memory means; and
      memory-output control means for outputting data from said first memory means to said output means; said character-generating means comprising:
      key-input means for inputting character data;
      storing means for storing character data input by said key-input means, and for outputting character data; and
      converting means for converting character data output from said storing means, into character pattern signals;
   second memory means for storing image information signals produced by said input means;
   memory control means for controlling the writing of data into, and the reading of data out from, said second memory means, said memory control means including means for controlling the writing of data into said second memory means in accordance with the signals produced by said position-detecting means;
   display means for displaying image information in response to the image information signals output from said second memory means, said display means including means for displaying the image information corresponding to the image information signals output from said second memory means, and for also displaying the character pattern corresponding to said character pattern signals output from said converting means;
   said character-generating means comprising:
      position-designating means for designating a position in the image information being displayed by said display means, at which the character data input by said key-input means is to be displayed; and
      key-input control means for storing the character data input by said key-input means, at that position in said storing means which has been designated by said position-designating means.

26. The manual sweeping apparatus as claimed in claim 25, wherein said input means includes photoelectric converting means for converting image information on said material into said image information signals while said housing is manually swept across said material, thereby optically reading the image information from said material.

27. The manual sweeping apparatus as claimed in claim 26, wherein said output means comprises:
   printing means for printing the signals output from said first memory means, on a printing medium while said housing is being manually swept across the printing medium;
   printing-driving means for driving said printing means in response to said signals output from said memory means and from said character-generating means; and
   printing-control means for controlling said printer-driving means in synchronism with the signals produced by said position-detecting means.

* * * * *